United States Patent
Page et al.

(10) Patent No.: US 10,593,921 B2
(45) Date of Patent: Mar. 17, 2020

(54) INTUMESCENT BATTERY HOUSING

(71) Applicant: URSATECH LTD., Barrie (CA)

(72) Inventors: John B. Page, Barrie (CA); Xiaoxiong Luo, Barrie (CA)

(73) Assignee: URSATECH LTD., Barrie (CA)

( * ) Notice: Subject to any disclaimer, the term of this patent is extended or adjusted under 35 U.S.C. 154(b) by 0 days.

(21) Appl. No.: 15/714,522

(22) Filed: Sep. 25, 2017

(65) Prior Publication Data
US 2018/0026245 A1 Jan. 25, 2018

Related U.S. Application Data

(63) Continuation-in-part of application No. 14/171,450, filed on Feb. 3, 2014, now Pat. No. 9,853,267.

(51) Int. Cl.
- *H01M 2/12* (2006.01)
- *H01M 2/10* (2006.01)
- *H01M 10/42* (2006.01)
- *H01M 10/613* (2014.01)

(52) U.S. Cl.
CPC ....... *H01M 2/1247* (2013.01); *H01M 2/1016* (2013.01); *H01M 2/127* (2013.01); *H01M 2/1252* (2013.01); *H01M 10/4207* (2013.01); *H01M 10/613* (2015.04)

(58) Field of Classification Search
None
See application file for complete search history.

(56) References Cited

U.S. PATENT DOCUMENTS

| | | |
|---|---|---|
| 3,955,330 A | 5/1976 | Wendt |
| 4,137,376 A | 1/1979 | Clegg et al. |
| 4,364,210 A | 12/1982 | Flemning et al. |
| 4,513,173 A | 4/1985 | Merry |
| 4,630,415 A | 12/1986 | Attwell |
| 4,754,377 A | 1/1988 | Wenman |
| 4,888,925 A | 12/1989 | Harbeke |
| 4,916,800 A | 4/1990 | Harbeke |
| 5,058,341 A | 10/1991 | Harbeke, Jr. |

(Continued)

FOREIGN PATENT DOCUMENTS

| | | |
|---|---|---|
| CA | 2255554 A1 | 12/1997 |
| CA | 2786202 A1 | 3/2013 |

(Continued)

OTHER PUBLICATIONS

Tremco Illbruck Coating Ltd., "B600 Intumescent Pipe Sleeve", Jun. 2010, retrieved Dec. 10, 2013 at: http://www.nullifirefirestopping.co.uk/celumdb/documents/Nullifire_B600_DS_GB_19530.pdf, (4 pages).

(Continued)

*Primary Examiner* — Tracy M Dove
(74) *Attorney, Agent, or Firm* — Marshall, Gerstein & Borun LLP

(57) ABSTRACT

A battery housing has a body and a lid mateable with the body. The body and the lid, when mated, provide a chamber dimensioned to hold at least one battery; and a venting passageway from the chamber. At least a portion of at least one of the body and the lid comprises an intumescent flame retardant material with an expansion ratio sufficient to drive gas from the chamber through the venting passageway and to seal the chamber when the material intumesces in the event of thermal runaway of a battery housed in the chamber.

25 Claims, 15 Drawing Sheets

(56) References Cited

U.S. PATENT DOCUMENTS

| | | |
|---|---|---|
| 5,103,609 A | 4/1992 | Thoreson et al. |
| 5,129,201 A | 7/1992 | Robertson et al. |
| 5,174,077 A | 12/1992 | Murota |
| 5,301,475 A | 4/1994 | Stefely |
| 5,417,019 A | 5/1995 | Marshall et al. |
| 5,452,551 A | 9/1995 | Charland et al. |
| 5,887,395 A | 3/1999 | Navarro et al. |
| 5,950,376 A | 9/1999 | Kemeny et al. |
| 6,105,334 A | 8/2000 | Monson et al. |
| 6,176,052 B1 | 1/2001 | Takahashi |
| 6,305,133 B1 | 10/2001 | Cornwall |
| 6,336,297 B1 | 1/2002 | Cornwall |
| 6,412,243 B1 | 7/2002 | Sutelan |
| 6,645,278 B2 | 11/2003 | Langille et al. |
| 6,694,684 B2 | 2/2004 | Radke et al. |
| 6,725,615 B1 | 4/2004 | Porter |
| 6,747,074 B1 | 6/2004 | Buckingham et al. |
| 6,790,893 B2 | 9/2004 | Nguyen et al. |
| 6,981,555 B2 | 1/2006 | Smith et al. |
| 7,080,486 B2 | 7/2006 | Badke et al. |
| 7,143,833 B2 | 12/2006 | Gaidano et al. |
| 7,182,143 B2 | 2/2007 | Hall et al. |
| 7,397,219 B2 | 7/2008 | Phillips et al. |
| 7,465,888 B2 | 12/2008 | Fischer et al. |
| 7,470,048 B2 | 12/2008 | Wu |
| 7,476,010 B2 | 1/2009 | Johnson |
| 7,486,047 B2 | 2/2009 | Phillips et al. |
| 7,651,238 B2 | 1/2010 | O'Brien |
| 7,651,248 B2 | 1/2010 | Hua |
| 7,670,033 B2 | 3/2010 | Steer et al. |
| 7,795,328 B2 | 9/2010 | Angenendt |
| 7,812,253 B2 | 10/2010 | Moselle |
| 7,913,468 B2 | 3/2011 | Spais |
| 7,954,974 B2 | 6/2011 | Johnson |
| 8,146,305 B2 | 4/2012 | Cordts |
| 8,263,254 B2 | 9/2012 | Mehta et al. |
| 8,277,965 B2 | 10/2012 | Hermann et al. |
| 8,367,233 B2 | 2/2013 | Hermann et al. |
| 8,393,121 B2 | 3/2013 | Beele |
| 8,397,452 B2 | 3/2013 | Stahl, Sr. et al. |
| 8,733,465 B1 | 5/2014 | Flood et al. |
| 8,951,654 B2 | 2/2015 | Sachdev et al. |
| 8,973,670 B2 | 3/2015 | Enk, Sr. |
| 9,088,054 B2 | 7/2015 | Lukso et al. |
| 9,089,716 B2 | 7/2015 | Peterson et al. |
| 9,099,756 B2 | 8/2015 | Choi et al. |
| 9,252,400 B2 | 2/2016 | LePort et al. |
| 9,406,917 B2 | 8/2016 | Petzinger |
| 9,437,849 B2 | 9/2016 | Duncan et al. |
| 2002/0155348 A1 | 10/2002 | Gitto |
| 2003/0013005 A1 | 1/2003 | Chang |
| 2003/0168225 A1 | 9/2003 | Denne et al. |
| 2004/0016190 A1 | 1/2004 | Radke et al. |
| 2004/0100040 A1 | 5/2004 | Sakno |
| 2004/0168398 A1 | 9/2004 | Sakno et al. |
| 2005/0170238 A1 | 8/2005 | Abu-Isa et al. |
| 2006/0071636 A1 | 4/2006 | Phillips et al. |
| 2006/0096207 A1 | 5/2006 | Spais |
| 2006/0234119 A1 | 10/2006 | Kruger et al. |
| 2007/0164711 A1 | 7/2007 | Kim et al. |
| 2007/0235200 A1 | 10/2007 | Gross |
| 2008/0011383 A1 | 1/2008 | Paetow et al. |
| 2008/0292950 A1 | 11/2008 | Maeda et al. |
| 2009/0071664 A1 | 3/2009 | Sitabkhan |
| 2009/0218130 A1 | 9/2009 | Monden et al. |
| 2010/0028758 A1 | 2/2010 | Eaves et al. |
| 2010/0078182 A1 | 4/2010 | Alkemade et al. |
| 2010/0136391 A1 | 6/2010 | Prilutsky et al. |
| 2010/0136404 A1 | 6/2010 | Hermann et al. |
| 2011/0064997 A1 | 3/2011 | Peskar et al. |
| 2011/0088342 A1 | 4/2011 | Stahl, Sr. et al. |
| 2011/0262783 A1 | 10/2011 | Mehta |
| 2011/0281154 A1 | 11/2011 | Vissers et al. |
| 2012/0022201 A1 | 1/2012 | Zhvanetskiy et al. |
| 2012/0034501 A1 | 2/2012 | Hermann et al. |
| 2012/0231318 A1 | 9/2012 | Buck et al. |
| 2012/0233943 A1 | 9/2012 | Monden et al. |
| 2012/0304979 A1 | 12/2012 | Munzenberger et al. |
| 2012/0308858 A1 | 12/2012 | Hermann et al. |
| 2012/0312562 A1 | 12/2012 | Woehrle et al. |
| 2013/0011701 A1 | 1/2013 | Petzinger |
| 2013/0017421 A1 | 1/2013 | Onnerud et al. |
| 2013/0017431 A1 | 1/2013 | Frisk et al. |
| 2013/0061545 A1 | 3/2013 | Van Walraven et al. |
| 2013/0086857 A1 | 4/2013 | Paetow et al. |
| 2013/0104474 A1 | 5/2013 | Klein |
| 2013/0118102 A1 | 5/2013 | Pilz et al. |
| 2013/0143076 A1 | 6/2013 | Sachdev et al. |
| 2013/0175058 A1 | 7/2013 | Williams et al. |
| 2013/0247487 A1 | 9/2013 | Turner |
| 2013/0264073 A1 | 10/2013 | Ling |
| 2013/0288083 A1 | 10/2013 | Sweetland et al. |
| 2013/0288100 A1 | 10/2013 | Dunkel et al. |
| 2013/0312947 A1 | 11/2013 | Bandhauer et al. |
| 2014/0017525 A1 | 1/2014 | Schaefer |
| 2014/0060859 A1 | 3/2014 | Kountz et al. |
| 2014/0065461 A1 | 3/2014 | Kountz et al. |
| 2014/0077043 A1 | 3/2014 | Foerg |
| 2014/0170447 A1 | 6/2014 | Woehrle et al. |
| 2014/0305668 A1 | 10/2014 | Berezovsky |
| 2015/0017491 A1 | 1/2015 | Specht et al. |
| 2015/0221914 A1 | 8/2015 | Page et al. |
| 2015/0258358 A1 | 9/2015 | Popp et al. |
| 2015/0343248 A1 | 12/2015 | Hee |
| 2016/0043368 A1 | 2/2016 | Kim |
| 2016/0107009 A1 | 4/2016 | Cordani |
| 2016/0126535 A1 | 5/2016 | Qiao et al. |
| 2016/0172727 A1 | 6/2016 | Chan et al. |

FOREIGN PATENT DOCUMENTS

| | | |
|---|---|---|
| CN | 101656304 B | 9/2011 |
| DE | 19934902 A1 | 1/2000 |
| DE | 202012003405 U1 | 8/2013 |
| DE | 102013203173 A1 | 10/2013 |
| EP | 0693303 A2 | 1/1996 |
| EP | 0635665 B1 | 3/1997 |
| EP | 1273841 A1 | 1/2003 |
| EP | 1416552 A2 | 5/2004 |
| EP | 2572760 A2 | 3/2013 |
| GB | 2077382 A | 12/1981 |
| GB | 2108614 A | 5/1983 |
| GB | 2422191 A | 7/2006 |
| GB | 2459538 A | 4/2009 |
| GB | 2471929 A | 1/2011 |
| GB | 2495009 A | 3/2013 |
| GB | 2515649 A | 12/2014 |
| GB | 2517222 A | 2/2015 |
| KR | 20070023973 A | 2/2007 |
| WO | 2011/124886 A2 | 10/2011 |
| WO | 2012/080758 A2 | 6/2012 |
| WO | 2013045937 A2 | 4/2013 |
| WO | 2013/145790 A1 | 10/2013 |
| WO | 2014/013265 A2 | 1/2014 |
| WO | 2015113133 A1 | 8/2015 |
| WO | 2015179597 A1 | 11/2015 |

OTHER PUBLICATIONS

PFC Corofil, "PFC Corofil Intemescent Conduit", retrieved Dec. 10, 2013 at: http://www.pfc-corofil.com/sites/default/files/products/downloads/pfc_corofil_intumescent_conduit.pdf, (1 page).

Fischer Fixing Systems, "Fischer Conduit intumescent—FCi", retrieved Dec. 10, 2013 at: https://www.byko.is/media/fischer/15_-_fischer_Conduit_Intumescent.pdf, (1 page).

ENIA (Energy Networks & Industrial Applications), "Fire stop barriers FIRE-Stop", retrieved Dec. 10, 2013 at: http://www.enia.gr/wp-content/uploads/2012/07/FireBarriersRaytechCatal_SIGGR.pdf, (7 pages).

The Sparks Direct Blog, "Aurora Fire Rated Downlights: How are they tested and how do they work?", retrieved Sep. 26, 2013 at: http://blog.sparksdirect.co.uk/tag/building-regulations/, (8 pages).

(56) References Cited

OTHER PUBLICATIONS

ISE Fire Products & Services Ltd., "Intumescent Fire Protection Products", 2013, retrieved Sep. 26, 2013 at: http://www.isefireproducts.co.uk/intumescent-products, (2 pages).

Kidde Fire Protection Services, "Intumescent Fire Seals Product Range", retrieved Sep. 26, 2013 at: http://www.kiddefps.com/utcfs/ws-407/Assets/Intumescent%20Fire%20Seals.pdf, (31 pages).

Pemko Manufacturing Co., Inc., "Adhesive Gasketing (AG): Adhesive-Backed Fire/Smoke Gasketing", retrieved Sep. 26, 2013 at:http://www.pemko.com/index.cfm?event=products.productListing&searchName=Search+by+Pemko+Product+Number&openFilter=loadPemkoPartNumberSearch&partNumber=s773&partCategoryIds=S773D%3A895, (6 pages).

Trademark Hardware, "Adhesive Weatherstrip, 5/16" Wide Silicone and Intumescent Fin", retrieved at: Sep. 26, 2013 at: http://www.tmhardware.com/Adhesive-Weatherstrip-Gasketing-Intumescent-Fin.html, (2pages).

Machine-generated English translation by EPO and Google, Description of EP1273841, Züll, Armin, "The invention relates to a fire sleeve", Jan. 8, 2003 (11 pages).

Machine-generated English translation by EPO and Google, Description DE19934902, Haupt, Gabriele, "The invention relates to a foreclosure of pipes, cables and ducts through walls or ceilings, as well as joints, columns and wall openings", Jan. 27, 2000 (7 pages).

Machine-generated English translation by EPO and Google, Description of DE202012003405, Doyma Gmbh & Co., "The invention relates to a wrapping tape for the fire-resistant sealing of pipe passages, with a first and an opposite second side having an intumescent material under heat", Aug. 29, 2013 (33 pages).

Machine-generated English translation by EPO and Google, Description of DE102013203173, Chikatimalla, Rajesh, "The invention relates to a wrapping tape for the fire-resistant sealing of pipe passages, with a first and an opposite second side having an intumescent material under heat", Oct. 10, 2013 (29 pages).

Tesla Motors Club, "Amazing Core Tesla Battery IP—18650 Cell" retrieved from web page: http://www.teslamotorsclub.com/showthread.php/17456-Amazing-Core-Tesla-Battery-IP . . . ; Nov. 18, 2013 (10 pages).

Proquest Dialog, Flame Retardancy News 14.11 (Nov. 2004), "Great Lakes Intros New Intumescents", retrieved from web page: http://search.proquest.com/professional/docview/671320957/141D2914C631D147EDD/6 . . . ; Nov. 18, 2013 (2 pages).

Peter Dockrill, "Scientists develop a lithium-ion battery that shuts down at high temperatures to avoid explosions", ScienceAlert, Jan. 12, 2016, retrieved on Oct. 2, 2016 from http://www.sciencealert.com/scientists-develop-a-lithium-ion-battery-that-shuts-down-at-high-temperatures-to-avoid-explosions (2 pages).

SINGAS by Qualitystreet SARL, "Product Data Sheet SINGAS F-Exx® 8.o Bio—0.8 Liters Foam based fire extinguisher for fire ratings: A-B-F", Status: Jan. 1, 2016, EAN-Code 260241 932508, www.singas.eu (12 pages).

Delta-Tec Fire Fighting Technolgoies, "TUNGUS", retrieved on Oct. 27, 2016 from http://www.deltatec.net/products/tungus.htm (4 pages).

Typhoon™ extinguishers, "Typhoon™: an innovative extinguisher for fire protection", retrieved on Oct. 27, 2016, https://iwma.net/fileadmin/user_upload/IWMC_2013/Herakles_Borg_IWMC_2013.pdf (17 pages).

PYROGEN (Australia)Pty. Ltd., "PYROGEN—Industrial Fixed Aerosol Fire Suppression System—Design, Operation & Maintenance Manual", Industrial Manual: DOM-00/07, Revision No. 1.8, issued Jul. 2000 (82 pages).

PYROGEN Ltd., "A revolution in fire suppression technology—PYROGEN—It really is rocket science", retrieved on Oct. 27, 2016 from http://www.pyrogen.com/Pyroleaflet.pdf (6 pages).

Extended European Search Report dated Feb. 25, 2019 in related EP Patent Application No. 18195963.6.

INTUMESCENT BATTERY HOUSING

CROSS-REFERENCE TO RELATED APPLICATION

This application is a continuation-in-part application of U.S. patent application Ser. No. 14/171,450, filed Feb. 3, 2014, the entire contents of which are incorporated herein by reference.

BACKGROUND

This relates to a battery housing made from an intumescent flame retardant material that intumesces in the event of a thermal runaway of a housed battery.

Batteries have long been used as mobile power sources. In recent years, advancements have increased the power density of both primary (non-rechargeable) and secondary (rechargeable) batteries. For example, the power density of primary lithium batteries has reached 4.32 MJ/L, while the power density of secondary lithium ion batteries has reached 2.63 MJ/L. As a result, the use of lithium and lithium ion batteries has become wide spread in a variety of applications, including consumer electronics, medical devices, industrial equipment, and hybrid/electric automobiles.

However, many batteries, and particularly lithium and lithium ion batteries, are vulnerable to thermal runaways, during which heat and gas are rapidly discharged from a battery and a fire hazard is created. A thermal runaway may be caused by manufacturing defects, accumulation of heat, internal short circuits, or external impacts or trauma. Further, a thermal runaway of a single battery may trigger the thermal runaway of adjacent batteries, and thereby cause a dangerous chain reaction.

It is known to apply a fire-resistant coating to batteries or to enclose batteries within fire-resistant walls. However, a fire-resistant coating or wall often does not provide sufficient thermal insulation to prevent a thermal runaway from causing further thermal runaways of other batteries kept in close proximity. In fact, some fire-resistant materials used for coatings or walls, such as mica, have relatively high thermal conductivity. It is also known to apply an intumescent coating to batteries. However, intumescent coatings typically cannot be applied in a layer thick enough to overcome the drawbacks mentioned above. In any event, applying a coating introduces an additional manufacturing step. Further, the functionality of a coating may be compromised by scratching or peeling.

SUMMARY

To limit the consequences of a thermal runaway of a battery, battery housings incorporating an intumescent flame retardant material that intumesces in the event of a thermal runaway of a housed battery are provided.

In an aspect, there is provided a battery housing having a body and a lid mateable with the body. The body and the lid, when mated, provide a chamber dimensioned to hold at least one battery and a venting passageway from the chamber. At least a portion of at least one of the body and the lid comprises an intumescent flame retardant material with an expansion ratio sufficient to drive gas from the chamber through the venting passageway and to seal the chamber, when the material intumesces in the event of thermal runaway of a battery housed in the chamber.

In another aspect, there is provided a battery housing having a body and a lid mateable with the body. The body and the lid, when mated, provide a plurality of battery chambers, each dimensioned to hold at least one battery, and a plurality of venting passageways, each venting passageway extending from one battery chamber of the plurality of battery chambers. At least a portion of at least one of the body and the lid comprises an intumescent flame retardant material with an expansion ratio sufficient to drive gas from any given battery chamber of the plurality of battery chambers through at least one of the plurality of venting passageways, and seal the given battery chamber, when the material intumesces in the event of thermal runaway of a battery housed in the given battery chamber.

In a further aspect, there is provided a battery housing comprising a first housing portion; and a second housing portion mateable with said first housing portion; said first housing portion and said second housing portion, when mated, providing: a chamber dimensioned to hold at least one battery; and a venting passageway from said chamber; at least a portion of at least one of said first housing portion and said second housing portion comprising an intumescent flame retardant material with an expansion ratio sufficient to drive gas from said chamber through said venting passageway and to seal said chamber, when said material intumesces in the event of thermal runaway of a battery housed in said chamber, a first metal plug embedded in said first housing portion so as to extend from said chamber to an exterior of said housing and a second metal plug embedded in said second housing portion so as to extend from said chamber to an exterior of said housing, said first metal plug and said second metal plug for providing an electrical connection to a battery housed in said chamber.

In another aspect, there is provided a battery housing comprising: a first housing portion; and a second housing portion mateable with said first housing portion; said first housing portion and said second housing portion, when mated, providing: a chamber dimensioned to hold at least one battery; and a venting passageway from said chamber; at least a portion of at least one of said first housing portion and said second housing portion comprising an intumescent flame retardant material with an expansion ratio sufficient to drive gas from said chamber through said venting passageway and to seal said chamber, when said material intumesces in the event of thermal runaway of a battery housed in said chamber, wherein said venting passageway is blocked by a blockage that fails when exposed to pressure created in said chamber by said thermal runaway, and wherein said blockage is formed from an identical material to that of a material forming one of said first housing portion and said second housing portion.

Any of the above battery housing may further comprise a powder chamber for storing a powder. The powder chamber has a plurality of openings for expelling stored powder out of the battery housing in the event of thermal runaway. The second housing portion may comprise a lid and the powder chamber. The powder chamber may be filled with a powder comprising a flame retardant material that, when heated, decomposes by an endothermic reaction to release an inert gas.

Other features will become apparent from the drawings in conjunction with the following description.

DETAILED DESCRIPTION

Figure 1:
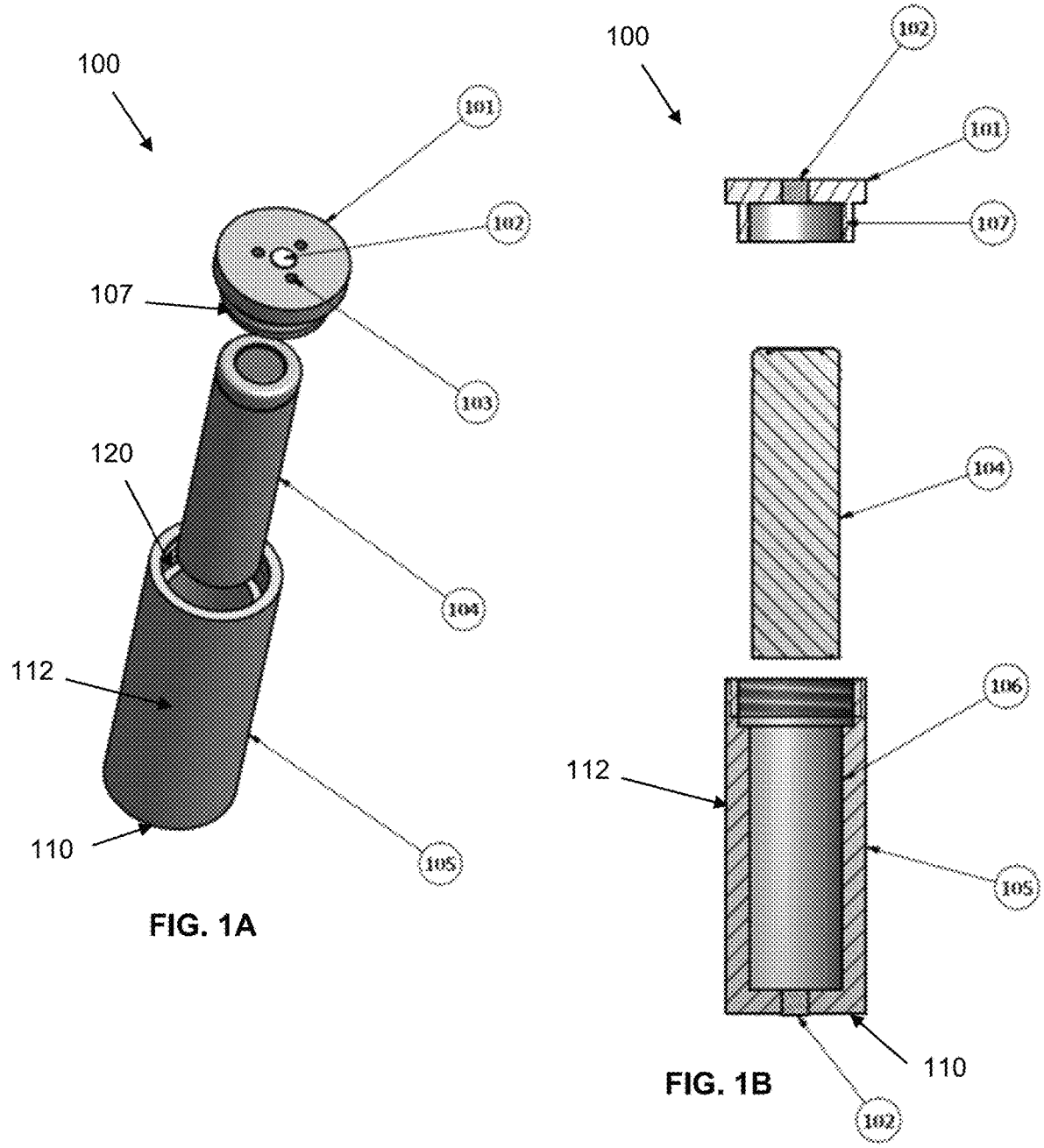
FIG. 1A is an exploded perspective view of a battery housing adapted to hold a battery.
FIG. 1B is an exploded cross-sectional view of the battery housing of FIG. 1A.

FIGS. 1A and 1B depict a battery housing 100 adapted to hold a battery 104. Housing 100 has a body 105 and a removable lid 101. Body 105 has a flat bottom 110 and a substantially cylindrical sidewall 112 defining a cavity 106 for receiving battery 104. When lid 101 is mated to body 105, lid 101 covers cavity 106 to form a chamber 108 substantially enclosing a battery received in cavity 106. As depicted, battery 104 is a conventional lithium or lithium ion format 18650 battery. Chamber 108 is substantially cylindrical in shape and is sized to fit one format 18650 battery.

Bottom 110, cylindrical sidewall 112, and lid 101 are fabricated of an intumescent flame retardant (IFR) material, as detailed below. This IFR material intumesces in the event of a thermal runaway of battery 104 to entomb battery 104 within chamber 108 and prevent the thermal runaway from spreading to any other batteries.

As depicted, bottom 110, sidewall 112, and lid 101 are about 6.5 mm thick. In other embodiments, this thickness may be between about 0.5 mm to 50 mm. As will become apparent, bottom 110, sidewall 112, and lid 101 are formed to have a thickness that provides sufficient structural integrity and thermal insulation in the event of a thermal runaway. Therefore, the thickness of bottom 110, sidewall 112, and lid 101 depends on the material(s) from which lid 101 and body 105 are formed. Such materials are described in more detail hereinafter.

As depicted in FIG. 1, lid 101 includes three through-holes 103 for venting gas, heat, and pressure in the event of a thermal runaway of battery 104. Each through-hole 103 provides a venting passageway that extends between chamber 108 and the exterior of housing 100. As will be detailed below, through-holes 103 are self-sealing in the event of a thermal runaway of battery 104. Optionally, each venting passageway may be blocked by a blockage (not shown) to form a blind-hole. Such a blockage, which is described in more detail hereinafter in connection with another embodiment, fails when exposed to pressure created in chamber 108 during a thermal runaway, thereby converting a blind-hole to a through-hole.

Housing 100 includes two connectors 102 that allow electrical connection to battery 104 when held in chamber 108. Thus, housing 100 may be used to hold battery 104 during operation of battery 104 (e.g., charging or discharging). Each connector 102 includes a conductor that extends through housing 100, e.g., through bottom 110 or lid 101 (FIG. 1B). One end of each conductor is positioned to contact a corresponding electrode of battery 104 when held in chamber 108, and the other end of each conductor is positioned to provide a contact external to housing 100. Connectors 102 may be formed using an insert injection molding process to embed a conductor (e.g., a metal plug) in lid 101 or body 105.

Lid 101 is securely fastenable to body 105 to retain heat/fire within chamber 108 in the event of a thermal runaway of battery 104. To this end, in the depicted embodiment, body 105 has interior screw threads 120 at its top end adapted to engage with complementary screw threads 107 of lid 101. Threads 120 and 107 allow lid 101 to be securely screwed to the top end of body 105. In other embodiments, lid 101 may be secured to body 105 in other ways, e.g., by way of clips, magnets, screws, bolts, or the like.

As noted, body 105 and lid 101 are made using an IFR material that includes one or more IFR polymer composites. Suitable IFR polymer composites may include base polymers, fire retardants, and blowing agents. If the base polymers are inherently fire retardant, such as PVC, CPVC, halogenated polyethylene Neoprene and phenolic resin, then the fire retardants can be omitted from the composite. Synergists such as antimony oxides and/or zinc borate can be added to improve the fire retardancy of a composite. Char-forming agents can be added to promote charring and increase yield (i.e., final volume after intumescence), and thereby improve the fire retardancy and thermal insulation of a composite. Optionally, other components such as smoke suppressants, pigments, and compatibilizers can also be added.

Suitable blowing agents include, but are not limited to, expandable graphites, intumescent alkali metal hydrated silicates, and intumescent alkali metal hydrated silicates with certain amount of other components such as those described in U.S. Pat. No. 6,645,278, the contents of which are incorporated herein by reference. The start expansion temperature (SET) of suitable blowing agents may vary between 130° C. to 300° C. When expandable graphite is used as a blowing agent, electrically-insulating pads should be positioned between the surfaces of chamber 108 and the electrodes of any batteries held in chamber 108 to prevent a short circuit. Other suitable blowing agents will also be apparent to those of ordinary skill in the art. Blowing agents in the composite are generally used in amount of about 1 weight percent (wt %) to about 70 wt %.

Suitable fire retardants include, but are not limited to, polymeric halogen, monomeric halogen, alumina trihydrate, magnesium di-hydroxide, mica, talc, calcium carbonate, hydroxycarbonates, phosphorus compounds, red phosphorus, borate compounds, sulfur compounds, nitrogen compounds, silica, and/or various metal oxides. Other suitable fire retardants will also be apparent to those of ordinary skill in the art. The concentration of the fire retardants in a composite generally varies from 5 wt % to 55 wt %.

Suitable base polymers include, but are not limited to, thermoplastics, such as polyethylene, polypropylene, polyamide, ABS, polybutylene terephthalate, polyethylene terephthalate, EVA, thermosetting plastics, and elastomers, such as epoxy, Neoprene, cross-linked polyethylene, silicone, NBR, thermoplastic elastomers, or the blend of above. Other suitable base polymers will be apparent to those of ordinary skill in the art.

A mixture of the different components described above can be compounded into a composite. This composite can in turn be formed into desired geometries by known polymer processing methods such as injection molding, insert injection molding, extrusion, compression molding, blowing molding, transfer molding, calendaring, rotation molding, thermoforming, or the like. The melting temperature of the base polymers should be lower than the SET of the blowing agents in the composite. The temperature between the melting temperature of the base polymers and the SET of the blowing agents is the processing window for the composite. An IFR polymer composite formulated to have an expansion ratio of between 1.2 and 400 is suitable.

During a thermal runaway of battery 104, a large amount of heat is rapidly generated. This causes the temperature of portions of battery 104 to rise significantly. In some cases, during a thermal runaway, the temperature in battery 104 may increase to about 900° C., with localized hot spots reaching up to 1500° C. At the same time, the thermal runaway generates a large volume of gas.

Battery 104, as is conventional, includes a venting mechanism within its cap assembly. This venting mechanism can discharge pressurized gas generated by a thermal runaway, and regulates the internal gas pressure of battery 104.

Unfortunately, the venting mechanism of battery 104 does not address the heat hazard created by a thermal runaway. In particular, a localized hot spot generated by a thermal runaway may perforate an exterior wall of battery 104 and allow heat/fire to spread. However, as detailed below, housing 100 intumesces in response to a thermal runaway of battery 104, to entomb battery 104 within chamber 108 and prevent heat/fire from spreading.

In particular, in the event of a thermal runaway of battery 104, the venting mechanism of battery 104 discharges gas, heat, and pressure into chamber 108. Heat accumulating in chamber 108 causes the temperature of its surfaces (i.e., interior surfaces of body 105 and lid 101) to rise significantly. When the temperature of such surfaces reaches the SET of the blowing agent in the IFR polymer composite(s) of body 105 or lid 101, body 105 or lid 101 will intumesce and char. The expansion ratio of the IFR material of body 105 and lid 101 is sufficient to cause expanding char to occupy any space in chamber 108, and thereby drive gas out of chamber 108 by way of through-holes 103. Driving gas from chamber 108 quickly quenches any developing fire. Further, the endothermic intumescent reaction of the IFR polymer composite material of lid 101/body 105 will also absorb a large amount of heat while expanding.

After gas has been driven from chamber 108, the above-noted expansion ratio is sufficient to cause the expanded char to seal through-holes 103, thereby entombing battery 104 within chamber 108 to form a "dead cell".

Quickly quenching any developing fire in chamber 108 mitigates heat generation of a thermal runaway, as does the endothermic nature of the intumescent reaction. Further, charring of body 105/lid 101 improves thermal insulation around chamber 108. Each of these mechanisms minimizes the heat conducted out of chamber 108, for example, to any adjacent batteries and prevents a thermal runway of battery 104 from inducing thermal runaway of those adjacent batteries. A chain reaction is thereby avoided.

Conveniently, multiple batteries can be safely placed in close proximity within respective housings 100. For example, multiple batteries may be organized in close proximity to form battery packs/modules during storage, transportation, or operational use of the batteries.

Figure 2:
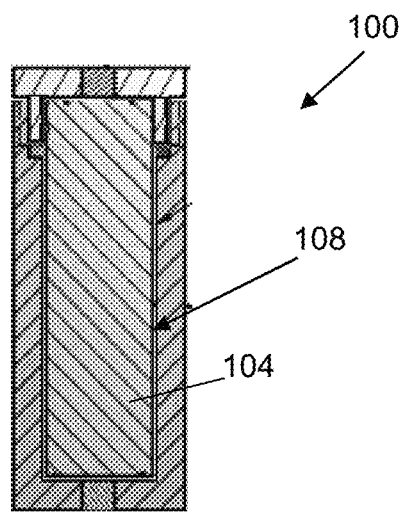
FIG. 2 is a cross-sectional view of the battery housing of FIG. 1A with its lid and body mated.
Figure 2A:
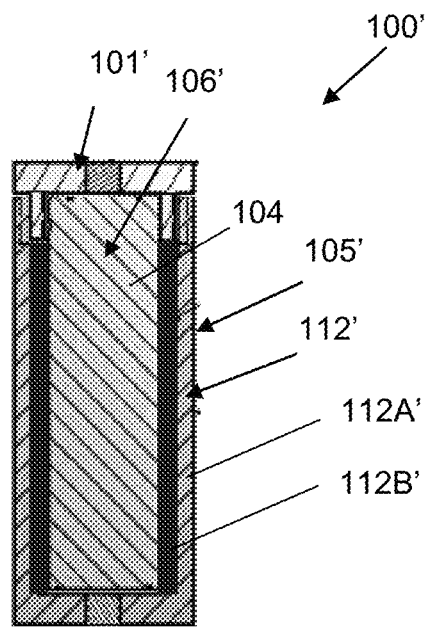
FIG. 2A is a cross-sectional view of a battery housing according to a second embodiment.

FIG. 2A illustrates a modified embodiment wherein the sidewall 112' of body 105' of housing 100' has an outbound portion 112A' and an inbound portion 112B'. In this embodiment, only the inbound portion 112B' of the sidewall of body 105' is made of an IFR material. The remainder of the body 105' and lid 101' are fabricated of other materials, such as metal. The inbound portion 112B' of the sidewall may be a liner which is either integral with the outbound portion 112B' of the sidewall or separable from it. Where the liner is separable, it may be fabricated of an IFR material which is flexible, such as an IFR foam, so that the liner may be wrapped around a battery 104 and then the liner and battery inserted in cavity 106' of the housing 100'. In either instance, the IFR material of the liner is chosen to have an expansion ratio sufficient to drive out gas from the battery chamber and seal the battery chamber in the event of thermal runaway of the battery held in the chamber.

Figure 3:
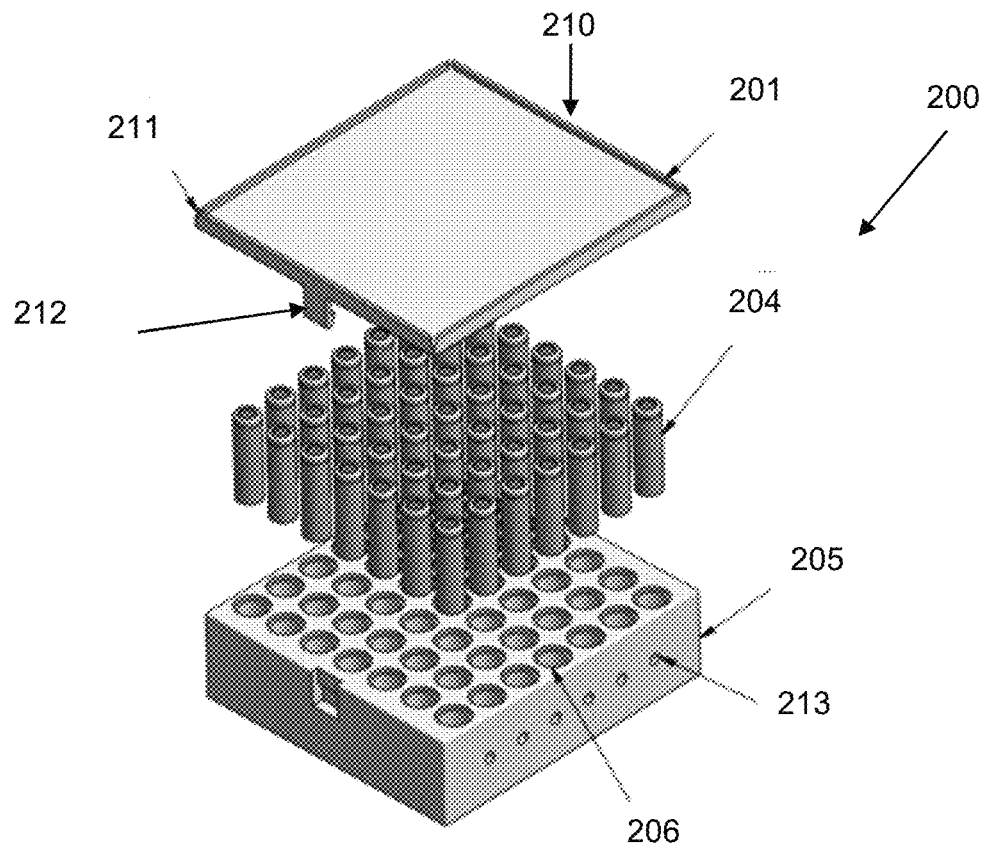
FIG. 3 is an exploded perspective view of a battery housing adapted to house a plurality of batteries.

FIG. 3 depicts a battery housing 200, exemplary of another embodiment. Whereas battery housing 100 is adapted to hold one battery, battery housing 200 is adapted to hold a plurality of batteries. In particular, as depicted, battery housing 200 is adapted to hold up to forty-nine format 18650 batteries (e.g., batteries 204).

Housing 200 has a body 205 and a removable lid 201. Body 205 is substantially square in shape and includes forty-nine cavities 206 arranged in a grid, each for receiving one of batteries 204. Of course, in other embodiments, body 205 may include a greater number or a fewer number of cavities, and the grid shape may vary. Each cavity 206 is spaced from adjacent cavities by a distance of approximately 6.5 mm. Cavities 206 around the perimeter of body 205 are spaced from the perimeter of body 205 by a distance of approximately 6.5 mm.

Figure 4:
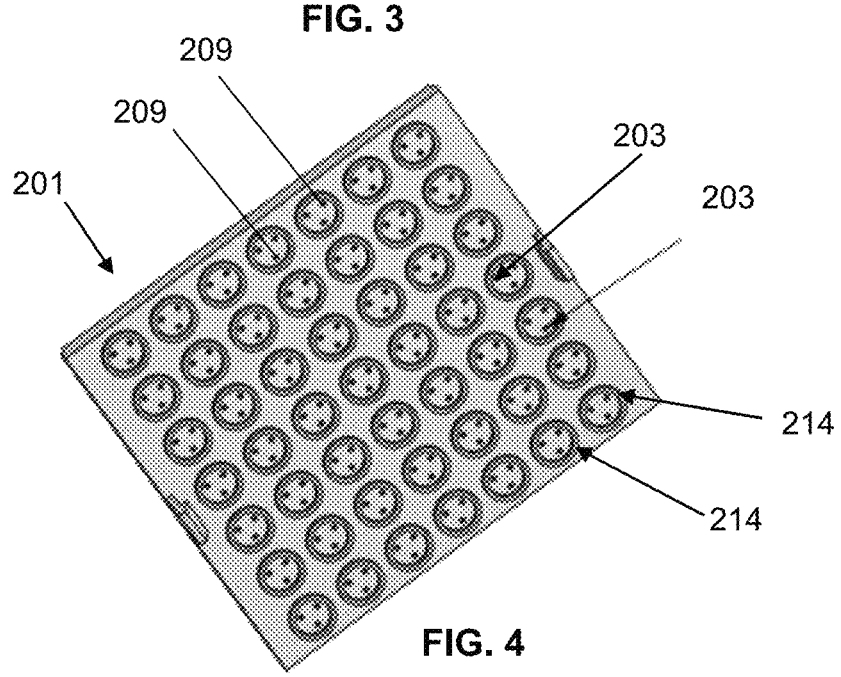
FIG. 4 is a bottom view of the lid of the battery housing of FIG. 3.

Referencing FIG. 4 along with FIG. 3, removable lid 201 is substantially flat. However, the bottom of removable lid 201 has an array of circular lips 214, each of which registers with one cavity 206 when lid 201 is mated to body 205. The circular rim of each cavity 206 is chamfered so that a lip 214 will nestle into the rim when lid 201 is mated to body 205. Thus, when lid 201 is mated to body 205, lid 201 closes each cavity 206 to form a plurality of chambers substantially enclosing batteries received in cavities 206. Such chambers are similar to chambers 108 (FIG. 2); for example, each chamber defined by lid 201 and body 205 is substantially cylindrical in shape and is sized to fit one format 18650 battery.

Lid 201 includes a plurality of blind-holes 203 for venting gas, heat, and pressure in the event of a thermal runaway. As depicted, blind-holes 203 are arranged such that three blind-holes 203 are aligned with each cavity 206. In this way, each chamber defined by lid 201 and body 205 is connected to three blind-holes 203. Each blind-hole 203 includes a venting passageway that extends between one chamber and the exterior of housing 200. These venting passageways are blocked by one or more blockages adapted to fail when exposed to pressure created by the pressure created in a chamber during a thermal runaway of a battery held in that chamber, thereby converting a blind-hole 203 to a through-hole. In the depicted embodiment, the blockage of each venting passageway is a thin wall 209 integral to lid 201 and having a thickness such that it is broken by the pressure created in a chamber during a thermal runaway of a battery held in that chamber. As depicted in FIG. 3, these thin walls 209 prevent venting passageways from being visible from the top of lid 201. Thin walls 209 may be formed integrally with lid 201 using an injection molding process and a suitable mold. As such, thin walls 209 may be formed of the same material as the remainder of lid 201. In other embodiments, walls 209 may be replaced with a thin film applied and bonded to the top surface of lid 201.

Lid 201 includes an upwardly projecting lip 210 extending about the perimeter of lid 201 to provide a space above housing 200 when stacked, e.g., when another battery housing is stacked on top of housing 200. In the depicted embodiment, the space provided above housing 200 may have a height of approximate 4.0 mm. In another embodiment, housing 200 may alternatively or additionally include a lip that projects downwardly from the bottom of housing 200 to provide a space below housing 200 when stacked, e.g., when housing 200 is stacked on top of another battery housing.

Lip 210 may include one more interruptions, each providing a gap 211 to allow gas and pressure to vent out of the space above/below housing 200 in the event of a thermal runaway of a battery held therein. As depicted, gaps 211 are located at the four corners of lid 201. When multiple stacks of housings are placed side-by-side, gas may travel from the space above/below a housing 200 to the space above/below an adjacent housing. In this way, pressure can be equalized among adjacent stacks of housings.

In some embodiments, gaps 211 may be omitted such that the space above/below housing 200 is substantially sealed when the housing 200 is stacked with other housings. Such embodiments may be suitable if housing 200 is expected to be used proximate to flammable materials (e.g., styrofoam or cardboard boxes). Sealing gas within the space above or below the housing 200 helps prevent such flammable materials from being ignited by gas/heat vented during a thermal runaway.

Lid 201 is securely fastenable to body 205 by way of one or more snap-fit clips 212. In other embodiments, lid 201 may be secured to body 205 in other ways, e.g., by way of screws, magnets, bolts, or the like.

Body 205 includes a plurality of spaced transverse channels 213 that extend through body 205 beneath cavities 206, from one side of body 205 to an opposite side of body 205. Channels 213 are adapted to receive cooling conduits (not shown in FIGS. 3 and 4) that provide thermal communication between the interior and exterior of body 205. These cooling conduits transfer waste heat generated by batteries 204 during operational use (e.g., charging or discharging) out of housing 200. The cooling conduits can also transfer heat generated during a thermal runaway out of housing 200. Suitable cooling conduits can be made from a high heat conductivity material, such as metal. Optionally, the cooling conduits can be made from a fire-resistant material.

Housing 200 may include a plurality of interior electrical connectors (not shown) that allow some or all of batteries 204 held in housing 200 to be connected according to predefined series and/or parallel arrangements. Housing 200 may also include connectors similar to connectors 102 (FIG. 1B) that allow electrical connections to be made between some or all of batteries 204 and the exterior of housing 200. Electrical connectors may be formed in housing 200 using an insert injection molding process.

Lid 201 and body 205 of housing 200 can be made from the same IFR polymer composite materials suitable for forming lid 101 and body 105 of housing 100 (FIG. 1A), discussed above. In the event of a thermal runaway of one of batteries 204 held in housing 200 (hereinafter, the "event" battery), gas, heat, and pressure are discharged into one of the chambers of housing 200 (hereinafter, the "event" chamber). This will cause the IFR material surrounding the event chamber to increase in temperature. When this temperature reaches the SET of the IFR material, the material will expand and char. At the same time, elevated pressure in the event chamber will break the thin walls 209 covering the blind-holes 203 connected to the event chamber, thereby converting those blind-holes 203 into through-holes that allow gas, heat, and pressure to vent out of housing 200. When housing 200 is stacked, the gas, heat, and pressure may enter the aforementioned space above housing 200, whereupon the gas, heat, and pressure may be further vented away from housing 200 by way of gaps 211.

The expansion ratio of the IFR material surrounding the event chamber is sufficient to cause expanding char to occupy any space in the event chamber, and thereby drive out gas from the event chamber by way of the above-noted through-holes converted from blind-holes 203. This quickly quenches any developing fire in the event chamber. Further, after gas has been driven out of the event chamber, the expanded char seals the through-holes connected to the event chamber, and thereby entombs the event battery within the event chamber, forming a "dead cell." The endothermic intumescent reaction of the IFR material of housing 200 absorbs heat during expansion. Further, cooling conduits received in channels 213 may transfer heat created by the thermal runaway out of housing 200. In these ways, batteries held in the other chambers of housing 200 are protected from heat generated by the thermal runaway in the event chamber. Batteries held in any adjacent housings are likewise protected from heat generated by the thermal runaway in the event chamber. Further, if heat discharged from housing 200 heats any IFR material of an adjacent housing beyond the SET of the IFR material of that adjacent housing, expansion in the adjacent housing will provide further protection.

Figure 5:
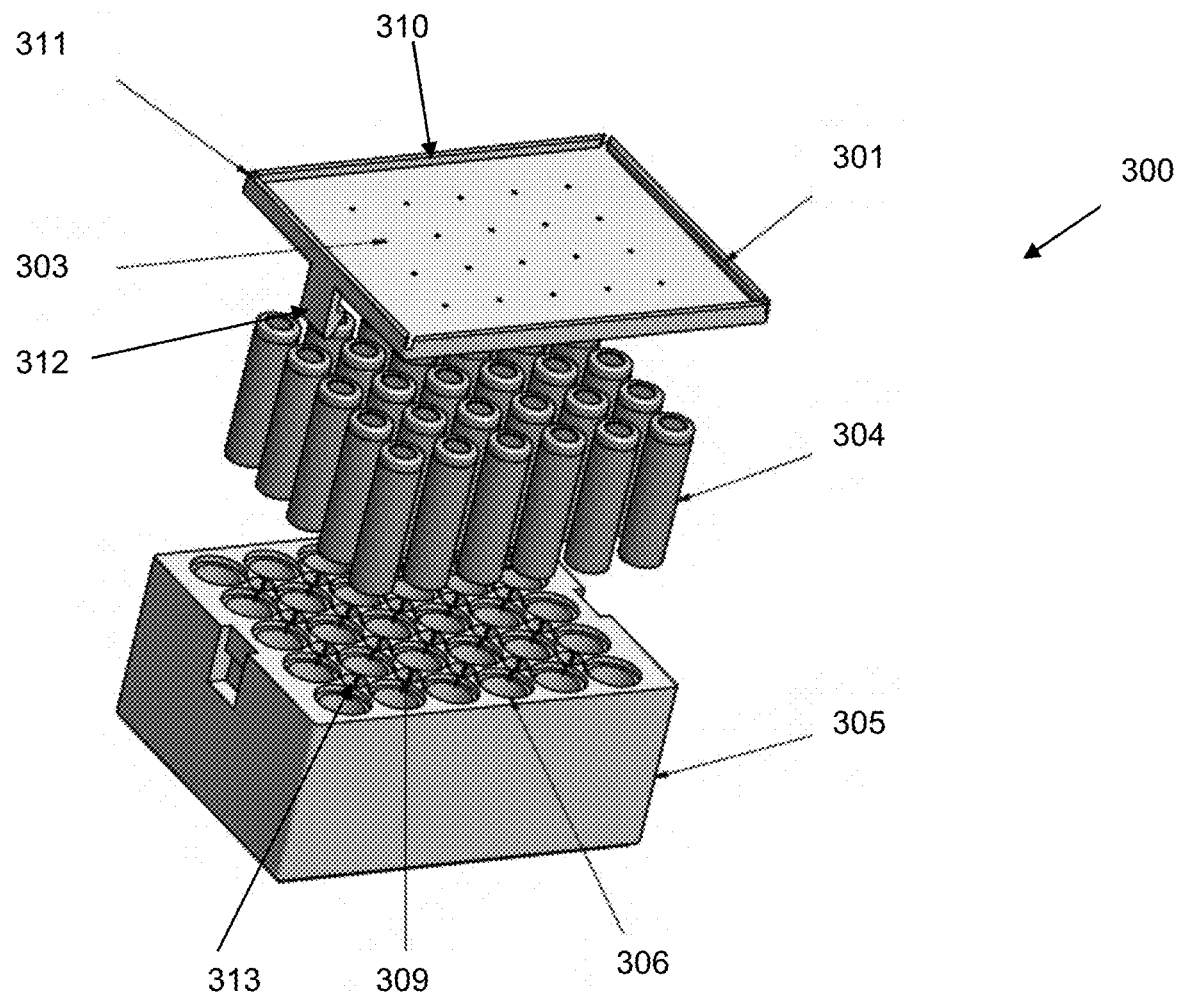
FIG. 5 is an exploded perspective view of a battery housing adapted to house a plurality of batteries, in accordance with an alternate embodiment.
Figure 6:
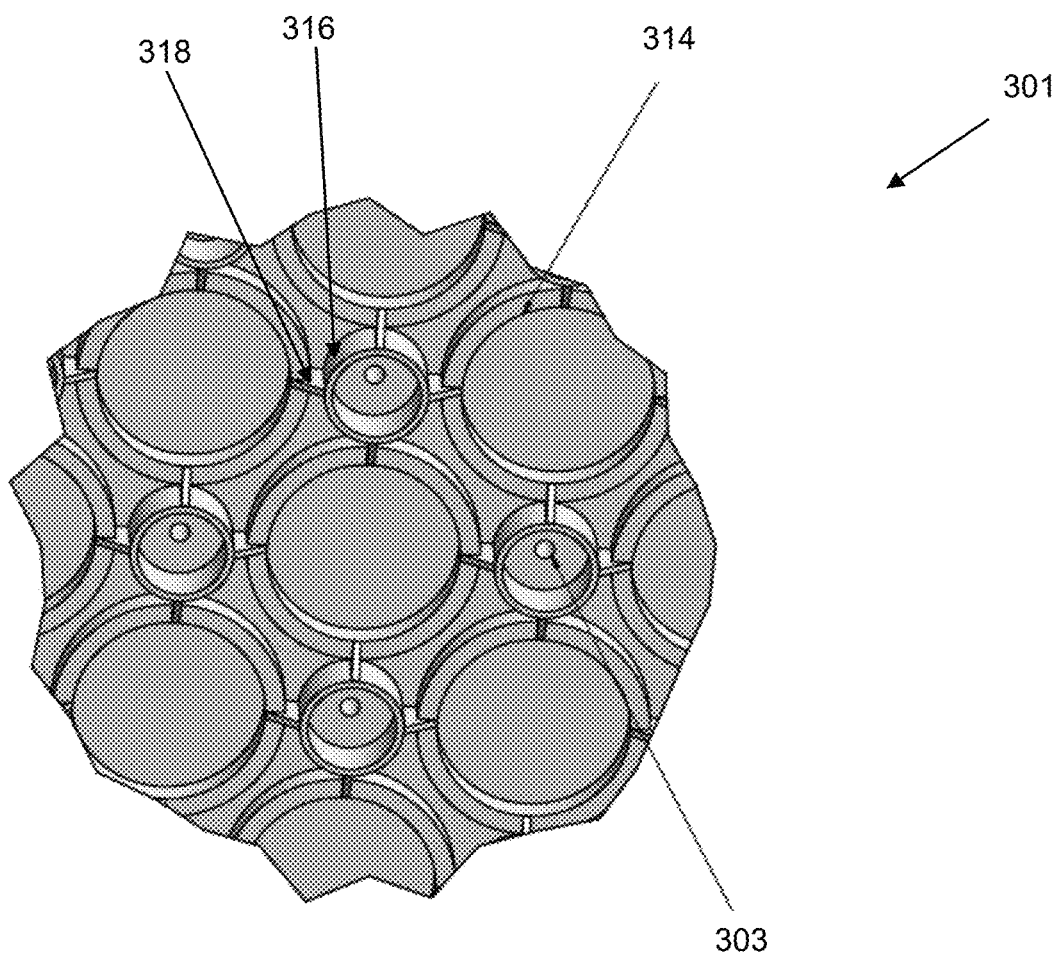
FIG. 6 is a partial bottom view of the lid of the battery housing of FIG. 5.
Figure 7:
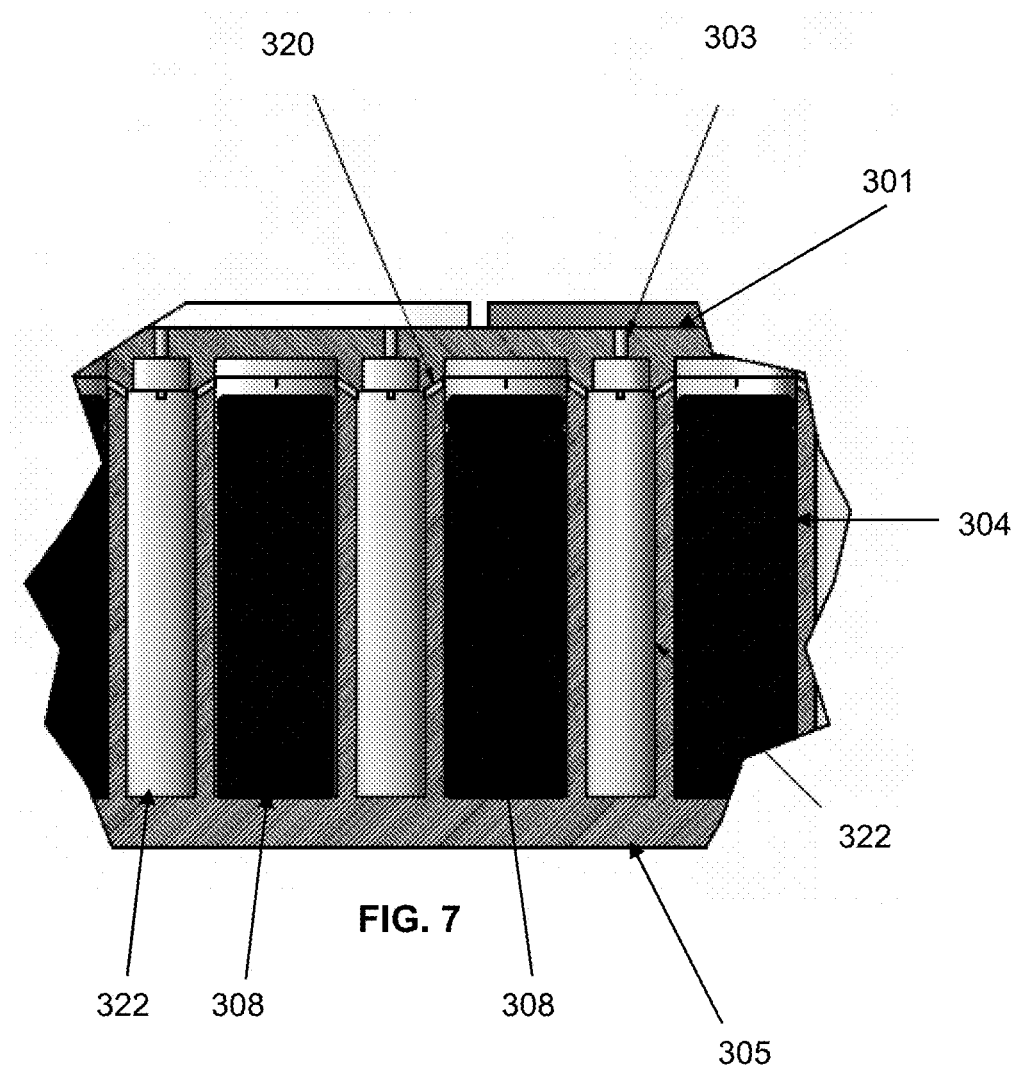
FIG. 7 is a partial cross-sectional view of the battery housing of FIG. 5 with its lid and body mated.

FIGS. 5-7 depict a battery housing 300, exemplary of a further embodiment. Like battery housing 200 (FIG. 3), battery housing 300 is adapted hold a plurality of batteries. In particular, as depicted, battery housing 300 is adapted to hold up to thirty format 18650 batteries (e.g., batteries 304).

Housing 300 has a body 305 and a removable lid 301. Like body 205 (FIG. 3), body 305 includes a plurality of cavities arranged in a grid, each for receiving a battery. In particular, as depicted in FIG. 5, body 305 includes thirty battery cavities 306, each for receiving one of batteries 304. In other embodiments, body 305 may include a greater number or a fewer number of battery cavities 306, and the grid shape may vary. Each battery cavity 306 is spaced from adjacent battery cavities 306 by a distance of approximately 6.5 mm. Battery cavities 306 around the perimeter of body 305 are spaced from the perimeter of body 305 by a distance of approximately 6.5 mm.

Unlike body 205 (FIG. 3), in addition to cavities for receiving batteries, body 305 also includes a plurality of venting cavities 309. As depicted, body 305 includes twenty venting cavities 309 arranged in a grid overlapping with the grid of battery cavities 306 such that each venting cavity 309 is disposed between diagonally-neighbouring battery cavities 306. As further detailed below, each venting cavity 309 is for receiving gas vented from at least one adjacent battery cavity 306 during a thermal runaway of a battery received in that battery cavity. Each venting cavity 309 is spaced from adjacent battery cavities 306 by a distance of approximately 3.0 mm. Downward sloping open channels 313 connect each venting cavity 309 to its adjacent battery cavities 306, as further discussed below. In other embodiments, body 305 may include a greater number or a fewer number of venting cavities 309, so long as each battery cavity 306 is connected at least one venting cavity 309. In some embodiments, a dedicated venting cavity 309 may be provided for each battery cavity 306. As will be appreciated, providing venting cavities 306 in body 305 reduces the mass of housing 300, which may ease transport of housing 300.

Referencing FIG. 6 along with FIG. 5, removable lid 301 is substantially flat. However, the bottom of removable lid 301 has an array of substantially circular lips 314, each of which registers with one battery cavity 306 when lid 301 is mated to body 305. The circular rim of each battery cavity 306 is chamfered so that a lip 314 will nestle into the rim when lid 301 is mated to body 305. Thus, when lid 301 is mated to body 305, lid 301 closes each battery cavity 306 to form a plurality of battery chambers 308 (FIG. 7) substantially enclosing batteries received in battery cavities 306. Battery chambers 308 are similar to chambers 108 (FIG. 2); for example, each battery chamber 308 defined by lid 301 and body 305 is substantially cylindrical in shape and is sized to fit one format 18650 battery.

The bottom of removable lid 301 also has an array of substantially circular lips 316, each of which registers with one venting cavity 309 when lid 301 is mated to body 305. The circular rim of each cavity 309 is chamfered so that a lip 316 will nestle into the rim when lid 301 is mated to body 305. Thus, when lid 301 is mated to body 305, lid 301 closes each venting cavity 309 to form a plurality of substantially enclosed venting chambers 322 (FIG. 7) for holding gas vented during a thermal runaway of a battery held in an adjacent battery chamber 308. As depicted, each venting chamber 322 is substantially cylindrical in shape, and has a diameter of approximately 9.0 mm and a height approximately equal to the height of battery chambers 308. The size and shape of venting chambers 322 may vary in other embodiments.

As depicted, lips 316 protrude farther from the bottom surface of lid 301 than lips 314. Tapered ribs 318 extend from the protruded end of each lip 316 to each adjacent lip 314. Each tapered rib 318 registers with one downward sloping open channel 313 of body 305 when lid 301 is mated to body 305 to form a substantially enclosed battery chamber venting passageway 320 between a battery chamber 308 and each adjacent venting chamber 322. Channels 313 and ribs 318 both slope at an angle of approximately 57 degrees relative to the bottom surface of lid 301. As such, each passageway 320 is formed to slope downwardly from a battery chamber 308 to an adjacent venting chamber 322 at this angle when battery housing 300 is oriented horizontally.

Lid 301 includes a plurality of through-holes 303 which provide venting chamber venting passageways for venting gas, heat, and pressure in the event of a thermal runaway. As depicted, through-holes 303 are arranged such that a through-hole 303 is provided in each venting cavity 309. In this way, each venting chamber 322 defined by lid 301 and body 305 is connected to a through-hole 303. Each through-hole 303 provides a venting passageway that extends between one venting chamber 322 and the exterior of housing 300. In the depicted embodiment, through-holes 303 have larger diameters than venting passageways 320. In some embodiments, through-holes 303 may be replaced with blind-holes similar to blind-holes 203 (FIG. 4).

Lid 301 is otherwise similar to lid 201 (FIG. 3). For example, lid 301 includes an upward projecting lip 310 similar to lip 210. Lip 310 extends about the perimeter of lid 301 to provide a space above housing 300 when stacked. In another embodiment, housing 300 may alternatively or additionally include a lip that projects downwardly from the bottom of housing 300 to provide a space below housing 300 when stacked. Like lip 210, lip 310 may include one more interruptions, each providing a gap 311 to allow gas and pressure to vent out of the space above/below housing 300 in the event of a thermal runaway of a battery held therein. Lid 301 also includes one or more snap-fit clips 312 similar to snap-fit clips 212. Snap-fit clips 312 allow lid 301 to be securely fastened to body 305.

In some embodiments, body 305 may include a plurality of spaced transverse channels similar to channels 213 of body 205 (FIG. 3). Such channels extend through body 305 beneath battery cavities 306 and venting cavities 309, and receive cooling conduits that provide thermal communication between the interior and exterior of body 305.

Like housing 200 (FIG. 3), housing 300 may include a plurality of interior electrical connectors that allow some or all of batteries 304 held in housing 300 to be connected according to predefined series and/or parallel arrangements. Housing 300 may also include connectors similar to connectors 102 (FIG. 1B) that allow electrical connections to be made between some or all of batteries 304 and the exterior of housing 300. Electrical connectors may be formed in housing 300 using an insert injection molding process.

Lid 301 and body 305 of housing 300 can be made from the same IFR polymer composite materials suitable for forming lid 101 and body 105 of housing 100 (FIG. 1A), discussed above.

In the event of a thermal runaway of one of batteries 304 held in housing 300 (hereinafter, the "event" battery 304), gas, heat, and pressure from the event battery 304 are discharged into the battery chamber 308 holding that battery (hereinafter, the "event" chamber 308). This will cause the IFR material surrounding the event chamber 308 to increase in temperature. When this temperature reaches the SET of the IFR material, the material will expand and char.

The expansion ratio of the IFR material surrounding the event chamber 308 is sufficient to cause expanding char to occupy any space in the event chamber 308, and thereby drive out gas from the event chamber 308 to adjacent venting chambers 322 by way of sloping venting passageways 320. Any developing fire in the event chamber 308 is thereby quickly quenched. Further, after gas has been driven out of the event chamber 308, the expanded char seals venting passageways 320 connected to the event chamber 308, and thereby entombs the event battery 304 within the event chamber 308, forming a "dead cell."

Gas vented into a venting chamber 322 from the event chamber 308 is further vented to the exterior of housing 300 by way of a through-hole 303. The slope of venting passageways 320 connecting other battery chambers 308 to the event chamber 308 increases the back pressure on the expanding gases from event battery 304. This increased back pressure, along with the fact that venting passageways 320 have smaller diameters than through-holes 303, help to direct these gases out of housing 300 by way of through-holes 303. When the IFR material around a through-hole 303 is heated to its SET, this material will expand and char to seal the through-hole 303. Similarly, when the IFR material around venting passageways 320 connecting the event battery chamber 308 to other batteries chambers 308 is heated to its SET, this material will expand and char to seal these venting passageways 320.

In embodiments where through-hole 303 is replaced by a blind-hole, gas may accumulate in venting chamber 308 until increasing pressure in a venting chamber 308 causes the blockage blocking the venting passageway of the blind-hole to fail, thereby converting the blind-hole to a through-hole. In embodiments where through-holes 303 are omitted and not replaced by blind-holes, gas that accumulates in a venting chamber 322 is retained therein until lid 301 is removed, e.g., when housing 300 is serviced.

Quickly quenching any developing fire in chamber 308 mitigates heat generation of a thermal runaway, as does the endothermic nature of the intumescent reaction. Meanwhile, charring of body 305/lid 301 improves thermal insulation around chamber 308. Further, as noted above, the slope of venting passageways 320 and the fact that venting passageways 320 have smaller diameters than through-holes 303 helps to direct gases generated by event battery 304 out of housing 300 by way of through-holes 303. This reduces flow of such gases from venting chambers 309 to adjacent battery chambers 308. Each of these mechanisms minimizes the heat conducted to other batteries 304, and prevents a thermal runway of battery 308 from inducing thermal runaway of those other batteries.

Conveniently, as event chamber 308 vents into adjacent venting chambers 322 rather than directly to the exterior of housing 300, flames/sparks escaping from event chamber 308 may be contained inside the adjacent venting chambers 322. This helps to prevent fire from spreading to the exterior of housing 300.

Optionally, during use, battery housings (e.g., housings 200 or 300) may be covered by a rigid fire-resistant plate or mat to protect any flammable materials placed on top of the housing in the event of a thermal runaway. This plate or mat can be made from the same IFR polymer composites discussed above, or other thermally-insulative materials know to those of ordinary skill in the art. The plate or mat may rest atop upwardly projecting lips 210/310 such that space is provided between the plate or mat and the top of the battery housing to allow venting.

Figure 8:
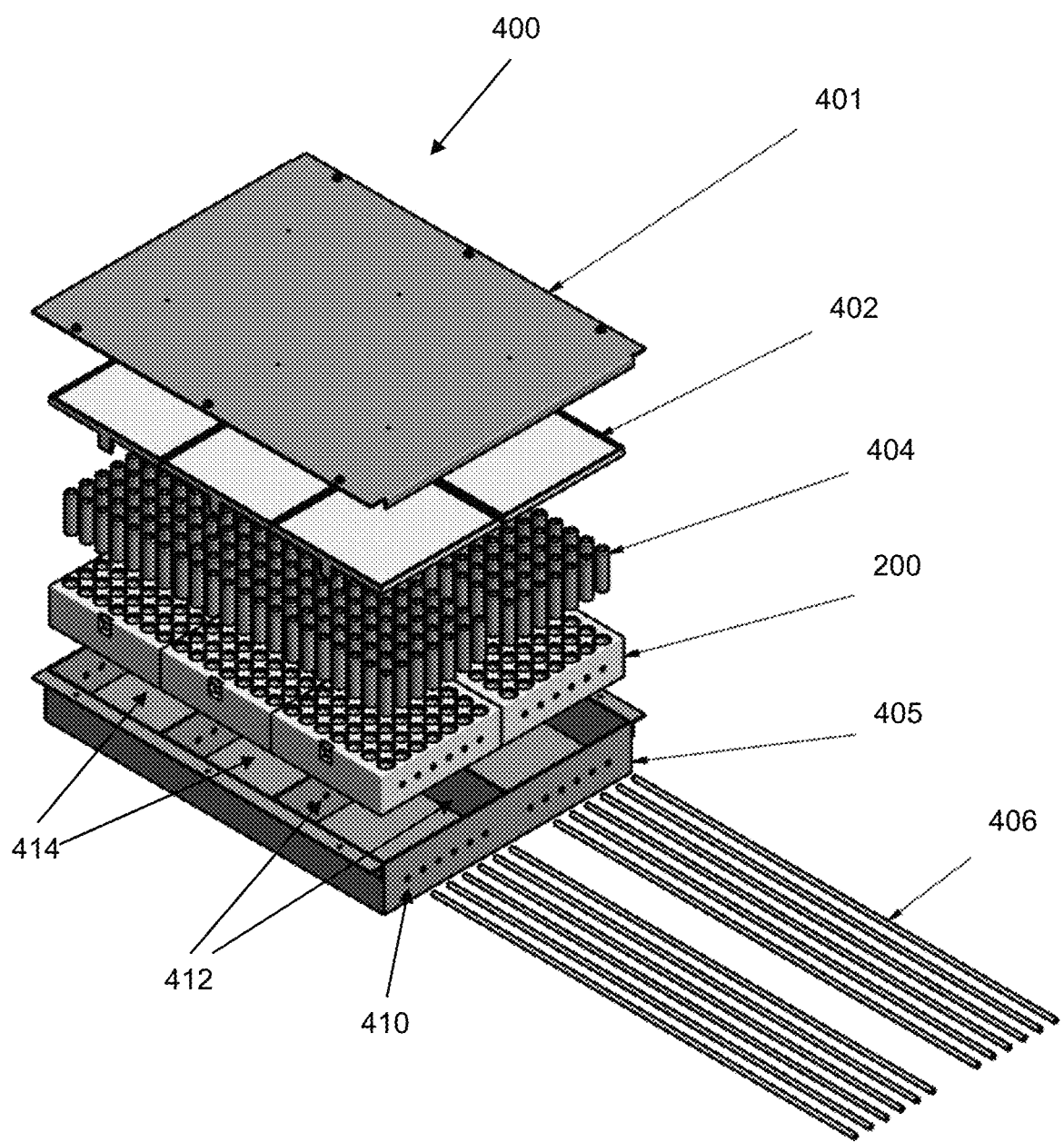
FIG. 8 is an exploded perspective view of a casing and a plurality of the battery housings of FIG. 3.

FIG. 8 depicts a casing 400 for encasing multiple battery housings, e.g., multiple housings 200. Casing 400 includes a body 405 and a removable lid 401. As depicted, body 405 includes interior walls 412 that, along with exterior walls 410 of body 405, define six compartments 414, each for receiving one housing 200. Interior walls 412 and exterior walls 410 include holes that align with channels 213 of battery housing 200 received by compartments 414 such that cooling conduits 406 may be extended through interior walls 412, exterior walls 410 and one or more housings 200 along the length of casing 400.

Lid 401 and body 405 can be made using steel, or another material that provides suitable mechanical rigidity. Lid 401 and body 405 may also be made from material to allow casing 400 to withstand explosions, including explosions of batteries within casing 400 and external explosions. Other suitable materials will also be readily apparent to those of ordinary skill in the art, such as, for example, carbon fiber/fiberglass reinforced polymer composites, ceramics, or the like. Lid 401 is securely fastenable to body 405 by screws (not shown). Other suitable fasteners that provide the above-mentioned mechanical rigidity or explosion-resistance to casing 400 may also be used.

When housings 200 are received in compartments 414 of body 405 and lid 401 is mated to body 405, upwardly projecting lips 210 of housings 200 provide a space between each housing 200 and lid 401. During a thermal runaway, gas, pressure, and heat may be discharged from one of housings 200 to this space. This gas, pressure, and heat may be retained in this space in embodiments where casing 400 is substantially sealed. In other embodiments, casing 400 may include holes or gaps that allow gas, pressure, and heat to be vented to the exterior of casing 400.

Although the casing 400 holds only one layer of battery housings, in other embodiments, casing 400 can be modified to hold multiple layers of battery housings such that sufficient voltage, current, and power can be supplied from one casing 400 to satisfy the requirements a large device such as, for example, an electric car, an aircraft, or a submarine.

In other embodiments, casing 400 may be modified to encase other battery housings such as, e.g., housing 300. For example, the exterior and interior walls of casing 400 could be modified to resize compartments 414 to receive such other housings.

Figure 9A:
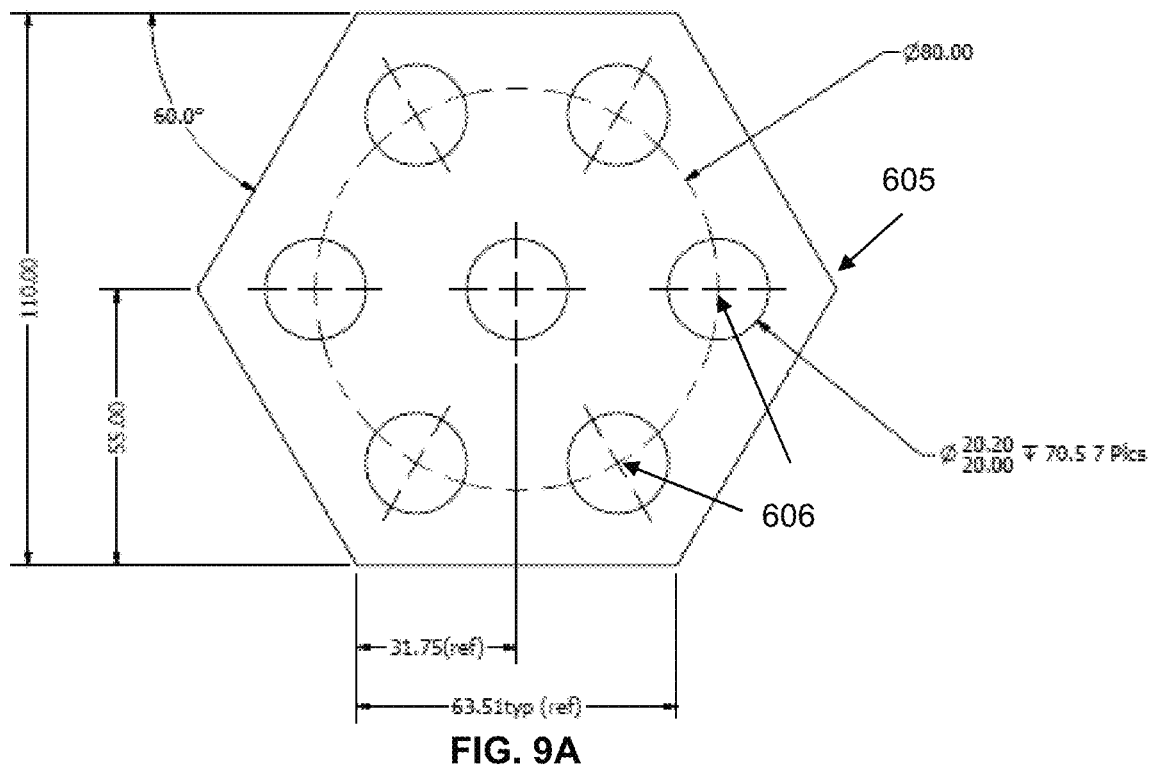
FIG. 9A is a top view of a battery housing body adapted to house seven batteries.
Figure 9B:
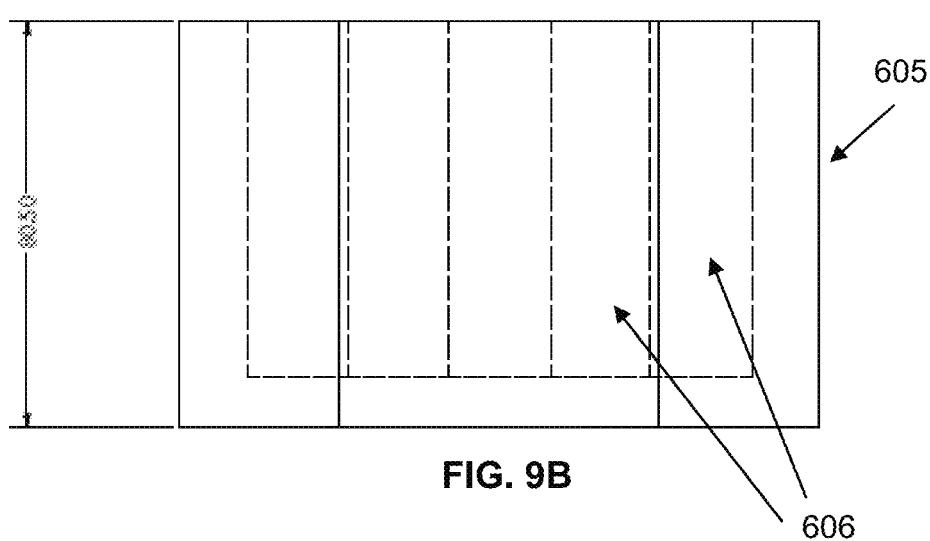
FIG. 9B is the side elevation view of the battery housing body of FIG. 9A.
Figure 10A:
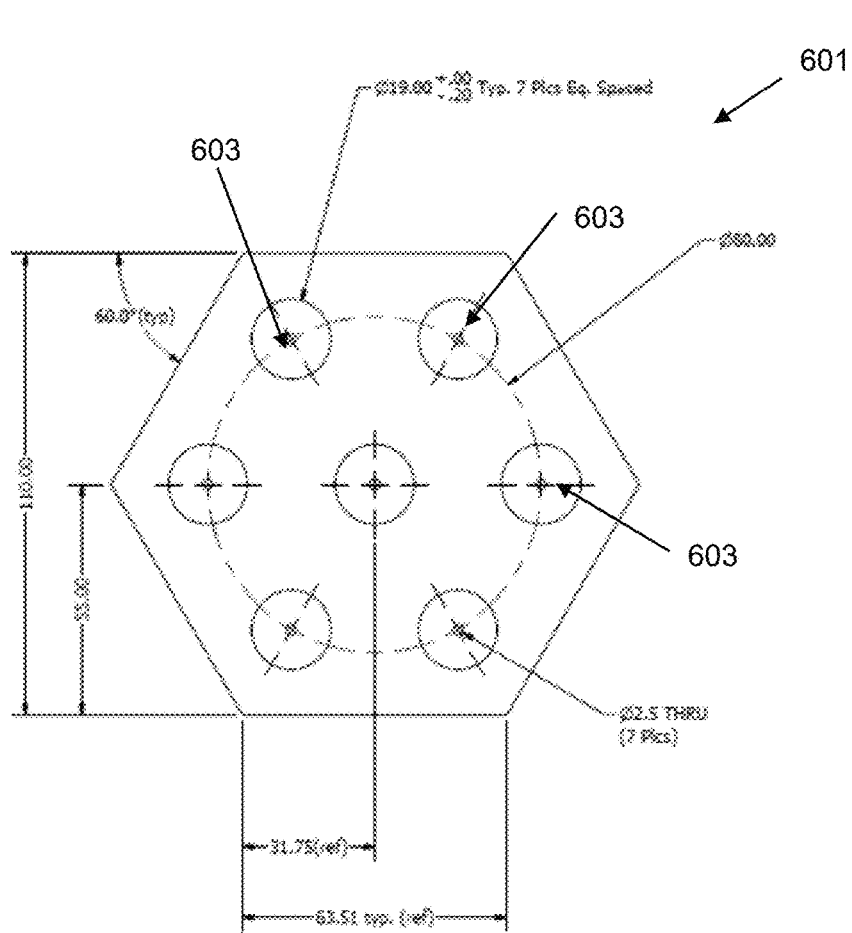
FIG. 10A is a bottom view of a battery housing lid matable with the battery housing body of FIG. 9A.
Figure 10B:
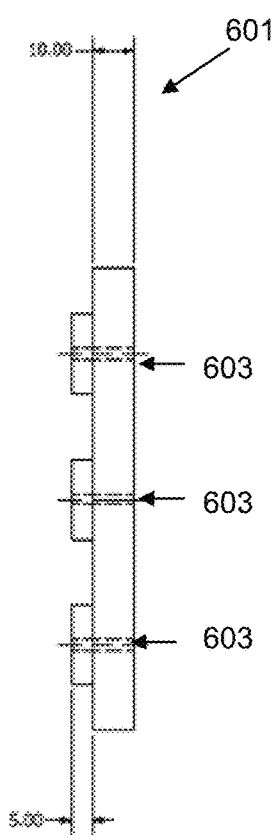
FIG. 10B is a side elevation view of the battery housing lid of FIG. 10A.

The operation of battery housings disclosed herein is further described with reference to tests conducted using a battery housing, as depicted in FIGS. 9A/9B and 10A/B. FIGS. 9A and 9B are respectively top and side elevation views of body 605 of the housing. FIGS. 10A and 10B are respectively bottom and side elevation views of lid 601 of the housing.

As best seen in FIG. 9A, the battery housing has seven cavities 606, each for receiving one format 18650 battery. As depicted, body 605 is hexagonal in shape, and cavities 606 are arranged in body 605 such that they are substantially equidistant from each other, e.g., at a distance of approximately 20 mm. As best seen in FIG. 10A, lid 601 includes a plurality of through-holes 603. Each through-hole 603 is aligned with one of the seven cavities 606 and provides a venting passageway for venting one of the seven substantially enclosed chambers formed when lid 601 is mated to body 605. Through-holes 603 are otherwise similar to through-holes 103 (FIG. 1A).

Lid 601 and body 605 are formed using an IFR polymer composite material having the following composition, by weight percentage:

Intumescent powder: 30.0%;

High density polyethylene (HDPE): 42.0%;

Antioxidant: 0.2%;

Fusabond™ E265: 3.0%;

Titanium dioxide: 1.5%;

Brominated polyethylene: 17.5%;

Antimony trioxide: 5.8%.

The intumescent powder is a blowing agent manufactured according to the processes described in aforementioned U.S. Pat. No. 6,645,278. The antioxidant improves the thermal stability of the HDPE and the brominated polyethylene for melt processing. Fusabond™ E265 is an anhydride modified high density polyethylene from DuPont™, which functions as a compatibilizer in the composite to improve adhesion among different components. Titanium dioxide inhibits smoke and improves the whiteness of the final articles. Brominated polyethylene is a fire retardant with excellent processability and compatibility. Antimony trioxide synergizes with bromine to improve the fire retardant effect.

To form the IFR material for lid 601 and body 605, the powder and pellets of the different components were weighed stoichiometrically and mixed. The mixture was then compounded at 170° C. in a single-screw extruder and pelletized. The composite pellets were then injection molded to form lid 601 and body 605.

The battery housing of FIGS. 9A/9B, 10A/10B was tested by simulating a thermal runaway of a battery held therein. Lid 601 and body 605 were subjected to ambient condition for over 48 hours prior to testing. Testing was carried out at an ambient temperature of 24° C. and a relative humidity of 21%.

Figure 11:
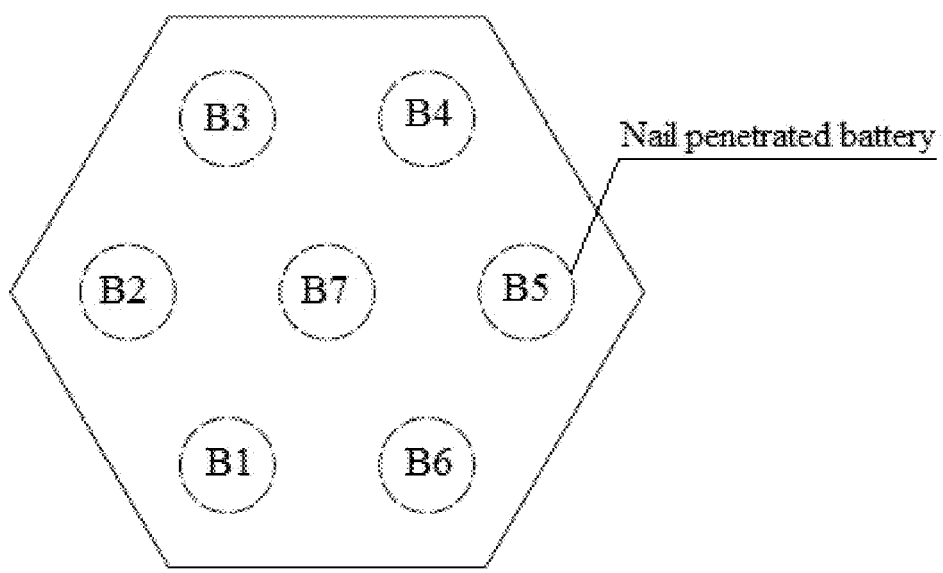
FIG. 11 is a top view of the battery housing body of FIG. 9A.

Two tests were conducted. In the first test, a heating cartridge was placed in central cavity B7 of the battery box of body 605 (FIG. 11). Six format 18650 lithium ion (lithium-ion-cobalt) batteries were placed in the six peripheral cavities B1-B6 of body 605. A thermocouple was placed inside each cavity to measure temperature during the test. The thermocouple in each peripheral cavity was attached to the battery placed in that cavity at a location closest to the central cavity B7 to obtain the highest temperature measurement.

Lid 601 was then securely fastened to body 605 using a plurality of screws (not shown), thereby enclosing the heating cartridge and the six batteries respectively within seven chambers defined by lid 601 and body 605.

The heating cartridge was then heated at 130° C./min to 653.4° C., and then immediately deactivated. Total heating duration was approximately 5 minutes. This duration was chosen to be far longer than the expected duration of a thermal runaway of a lithium ion battery, which typically lasts for approximately 30 to 55 seconds. Acquisition of temperature measurements by way of the thermocouples in each chamber was started before the heating cartridge was activated, and stopped after all the thermocouples showed decreasing temperature. The highest temperature measured by each thermocouple is shown in TABLE 1, below. Of note, the highest temperature for each of the batteries was recorded five minutes after the heating cartridge was deactivated.

After removing lid 601 of the housing, all six batteries held in the peripheral chambers (corresponding to cavities B1-B6 of FIG. 11) were observed to be intact. Meanwhile the heating cartridge held in the central chamber (corresponding to cavity B7 of FIG. 11) was surrounded by a thick layer of char. The char was produced by heating the IFR polymer composite material of lid 601 and body 605 to a temperature above the SET of the intumescent powder (i.e., approximately 200° C.), thereby causing the IFR material to intumesce.

The simulated thermal runaway in the central chamber did not increase temperatures in the peripheral chambers sufficiently to cause a thermal runaway of any of the batteries held in the peripheral chambers. As shown in TABLE I, the highest temperature measured within the peripheral cavities was only 37.7° C., well below the 232° C. threshold at which thermal runaway of lithium ion batteries is typically initiated. The test results show that char produced in response to the simulated thermal runaway and the material of lid 601/body 605 separating the chambers provided thermal insulation around the heating cartridge that greatly reduced heat transfer from the heating cartridge to the peripheral chambers. Further, the above-noted five minute delay between deactivation of the heating cartridge and measurement of the highest temperature in each of the peripheral chambers also evidences the effectiveness of the thermal insulation.

The second test was a nail-penetration test. In this test, a real thermal runaway and explosion of a battery held in the housing was induced. In particular, a battery having a 100% state of charge was penetrated with a metal nail to cause an internal short circuit. The effect of the induced thermal runaway and explosion event on other batteries held in the housing was observed.

Seven format 18650 lithium ion (lithium-ion-cobalt) batteries were placed into the seven cavities B1-B7 of housing body 605 (FIG. 11). Battery #5 placed in cavity B5 had a 100% state of charge. A thermocouple was attached to the surface of each of the seven batteries to measure temperature during the test. All of the thermocouples except the one attached to battery #5 were positioned at a location closest to cavity B5 to obtain the highest temperature measurement.

Again, lid 601 was securely fastened to body 605 using a plurality of screws (not shown), thereby enclosing the seven batteries respectively within seven chambers defined by lid 601 and body 605.

A metal nail was drilled through body 605 to penetrate battery #5 and cause an internal short circuit. Acquisition of temperature measurements was started before penetration, and stopped after all the thermocouples showed decreasing temperatures. The highest temperature measured by each thermocouple is shown in TABLE 2, below.

TABLE 1

| Thermocouple | Heating cartridge | Battery #1 | Battery #2 | Battery #3 | Battery #4 | Battery #5 | Battery #6 |
|---|---|---|---|---|---|---|---|
| Temperature (° C.) | 653.4 | 34.2 | 35.3 | 34.0 | 37.7 | 28.5 | 31.5 |

TABLE 2

| Thermocouple | Battery #5 (shorted) | Battery #1 | Battery #2 | Battery #3 | Battery #4 | Battery #6 | Battery #7 |
|---|---|---|---|---|---|---|---|
| Temperature (° C.) | 743.8 | 26.3 | 24.6 | 26.0 | 39.6 | 40.0 | 37.4 |

The results show that a thermal runaway was successfully triggered in battery #5 upon being penetrated by the metal nail. This thermal runaway caused battery #5 to reach a peak temperature of 743.8° C. Gas, spark, and smoke vented from the through-hole 603 connected to chamber B5 holding battery #5 for approximately 15 seconds, after which the through-hole 603 was sealed. This venting period was much shorter than the typical thermal runaway period (30 to 55 seconds) of a lithium ion battery. The shorter venting period indicated that the thermal runaway was quenched by the expanding char at an early stage.

After gas/smoke finished venting from the through-hole 603, the intumescing IFR material sealed off through-hole 603, the interface between lid 601 and body 605, as well as the hole created by the penetrating nail. The highest temperature measured in any of the chambers excluding the chamber holding battery #5 was 40.0° C., far below the 232° C. typically required to induce a thermal runaway event.

Upon removing lid 601 following the test, it was observed that battery #5 was fully embedded in char, forming a "dead cell". At the same time, the six other batteries remained intact. Further, the housing, aside from the intentional penetration, maintained its overall structural integrity.

Although through-holes (e.g., through-holes 103, 303, and 603) and blind-holes (e.g., blind holes 203) are shown to be located on the lid of battery housings in the depicted embodiments, through-holes and blind-holes can also be located in the body of battery housings, e.g., at the bottom or sides of the body. Further, the number of through-holes and blind-holes can vary, so long as at least one through-hole or blind-hole is provided to allow venting from each chamber for holding a battery. In the depicted embodiment, through-holes and blind-holes are shown to be round in shape. However, in other embodiments, through-holes and blind-holes may have another shape; for example, they may be slits. Any through-holes may be replaced with blind-holes, and conversely, any blind-holes may be replaced with through-holes.

Although chambers (e.g., chambers 108, 308, and 608) of the battery housings are shown to be adapted to hold a format 18650 battery, in other embodiments, chambers can be adapted to hold any other type of primary or secondary batteries or cells, of difference sizes, configurations and chemistries. Further, although each chamber is shown to be adapted to hold only one battery, in other embodiments, a chamber could be adapted to hold multiple batteries, e.g., stacked end-on-end or placed side-by-side.

In the embodiments of FIGS. 3 and 4; FIGS. 5 to 7, and FIGS. 9A to 11, the, lids (e.g., lids 201, 301, and 601) and bodies (e.g., body 205, 305, and 605) of battery housings were described as fabricated of an IFR material. However, in other embodiments, a lid and/or a body could be partly fabricated of other materials. For example, similar to the embodiment of FIG. 2A, a body could incorporate liners fabricated of an IFR material at each battery chamber. In such instance, the IFR material of the liners is chosen to have an expansion ratio sufficient to drive out gas from a battery chamber and seal the battery chamber in the event of thermal runaway of a battery held in that chamber. As with the embodiment of FIG. 2A, the liners may be an integral part of the body or a separable part of the body. Where the liners are separable, they could be formed of a flexible IFR foam and removed from the battery housings to be wrapped around each battery before the batteries/liners are placed inside the battery housings.

In the depicted embodiments, cooling conduits (e.g., conduits 406) are shown to extend transversely. However, the arrangement of cooling conduits can be changed to any other arrangement (e.g., running at a bias with respect to the sidewalls of the housing).

FIGS. 12, 13, 14 and 15 illustrate a further embodiment of a battery housing 1200.

Figure 12:
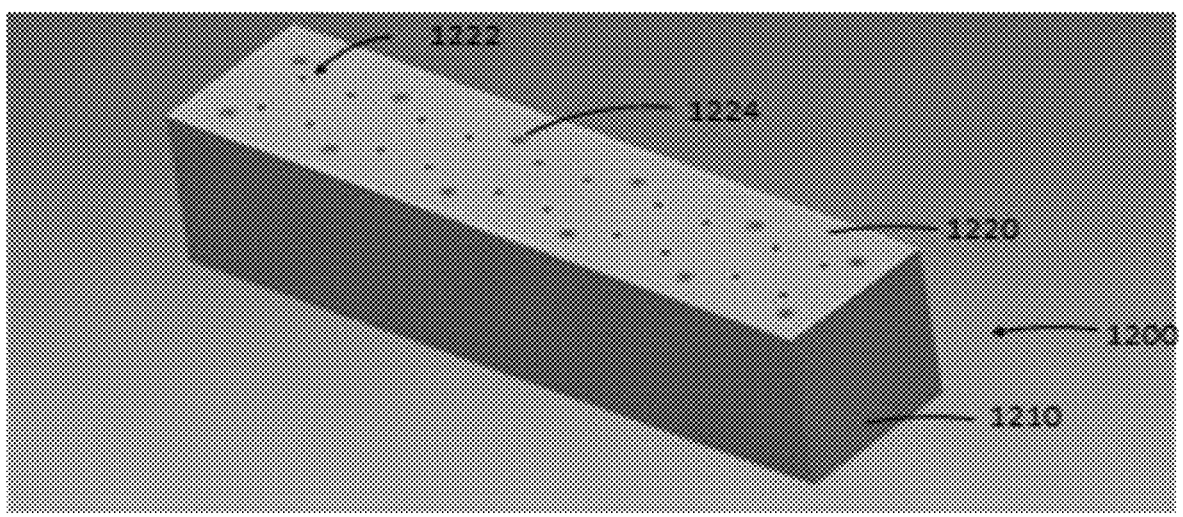
FIG. 12 is a top perspective view of another embodiment of a battery housing.

As depicted in FIG. 12, the battery housing 1200 has a base body 1210 and a removable lid 1220. Except as further described below, the body 1210 and lid 1220 may optionally have similar features and structures as described above with regard to FIGS. 1 to 11, and any one of battery housings 100, 100', 200, or 300.

Deviating from the housings 100, 100', 200 and 300, the housing 1200 additionally includes a powder chamber for storing a powder 1500 therein, and the lid 1220 has a plurality of through-holes 1222 for expelling the powder out of the battery housing 1200, as will be further explained below. The powder 1500 may be formed of a flame retardant material, the benefit(s) of which will become apparent.

Figure 13:
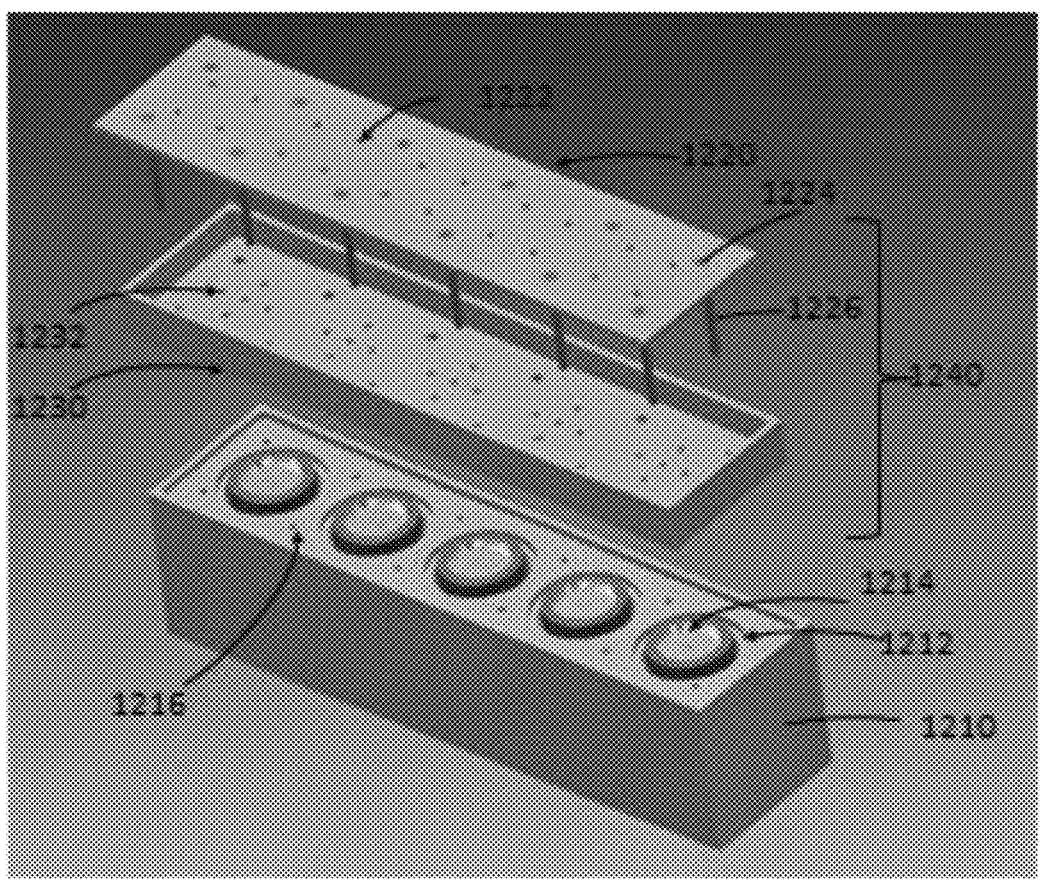
FIG. 13 is an exploded top perspective view of the battery housing of FIG. 12.

As shown in FIG. 13, the body 1210 defines a plurality of cavities 1212 for housing and holding battery cells 1214. In some embodiments, the cavities 1212 are configured and made of materials to isolate the battery cells 1214 from one another, so that in the event of a thermal runaway or fire, which may cause damage to one or more of the failed cells 1214, neighboring cells can be protected against possible damage and remain usable.

Figure 14:
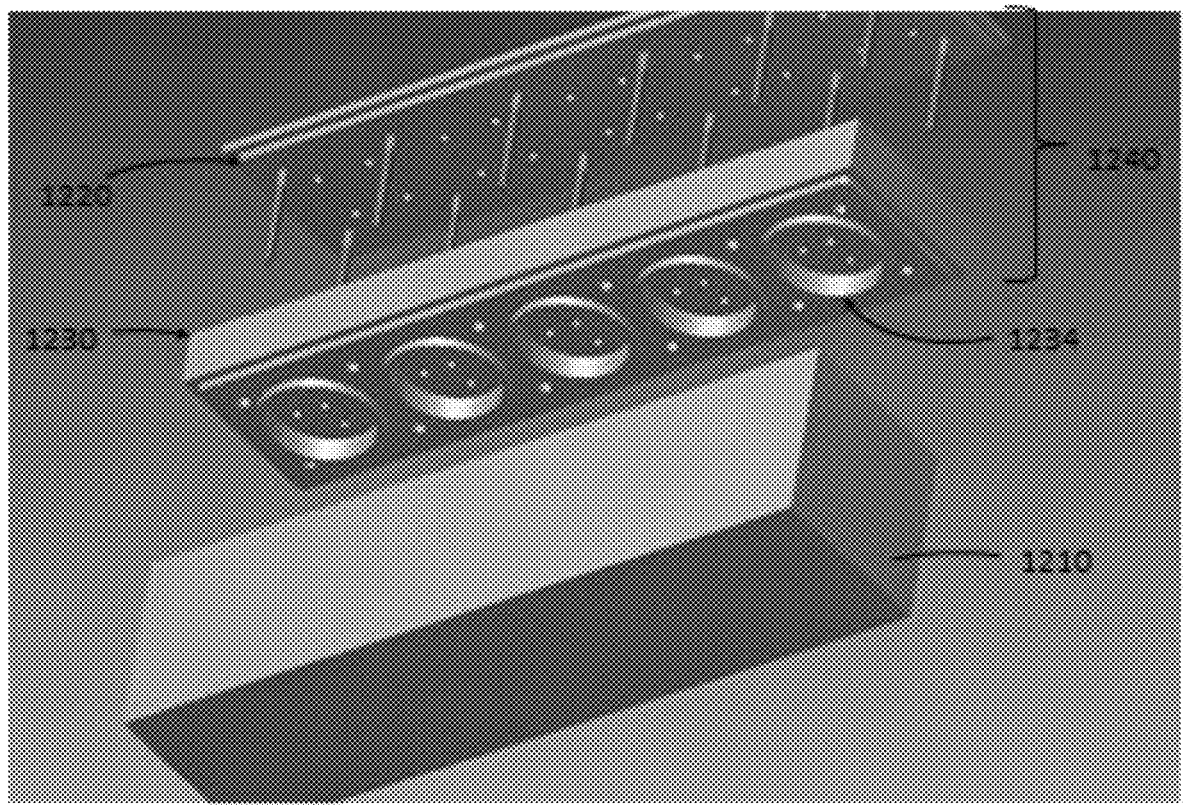
FIG. 14 is an exploded bottom perspective view of the battery housing of FIG. 12.

Housing 1200 also includes a powder tray 1230 as illustrated in FIGS. 13 and 14. The powder tray 1230 is shaped and configured to hold powder 1500 (not shown in FIGS. 12 to 14 but see FIG. 15). The lid 1220 and the powder tray 1230 when assembled form a lid assembly 1240, which defines the powder chamber. The powder chamber will be filled with the powder 1500 during use. The powder 1500 may be suitably packed but should be lose enough to allow it to be expelled out of the housing 1200 via through-holes 1222.

The bottom wall of powder tray 1230 also has through-holes 1232 to allow gases to pass through the powder tray 1230.

The body 1210, lid 1220, and powder tray 1230 may have matching stepped or lipped edges to facilitate positioning and mating of the powder tray 1230 onto the body 1210, and the lid 1220 onto the powder tray 1230. The edges may be sealingly engaged to prevent leakage of gases and powders through the gaps between the lid 1220 and the body 1210. The lid 1220 and powder tray 1230 may be fastened on to the body 1210 with a plurality of fasteners 1224, each of which has an elongated fastener body 1226 with a threaded terminal end. The body 1210 has corresponding threaded openings 1216 for receiving and engaging the threaded end of the fastener 1224.

As depicted in FIG. 14, the underside of the powder tray 1230 may have circular lips 1234 that match and mate with the top of the cells 1214 and cavities 1212 to provide positioning and mounting support, as well as directing any gas produced in a cavity 1212. For example, the lips 1234 may be configured to fit closely with cavities 1212 to reduce or minimize gas released through the sides of battery housing 1200 (i.e. at the interface between body 1210 and powder tray 1230). Instead, the gas is preferentially channeled upwards the space between the lid 1220 and the powder tray 1230 through holes 1232 of powder tray 1230. The benefit of this channeling will become apparent below.

Battery housing 1200, including the body 1210, the lid 1220 and the powder tray 1230 may be formed of any suitable material and may optionally be formed of an intumescent plastic. Materials described herein for other similar housing parts may be used.

In some embodiments, the body 1210 and the lid assembly 1240 may be formed from different materials, where the material(s) of the lid assembly 1240 are selected to provide better control (i.e. preventing significant changes) of the sizes of the holes 1222 during heating or a fire.

The powder 1500 in the lid assembly 1240 may be formed of a flame retardant material and may be selected such that when it is heated to a temperature below the electrolyte flashpoint of the battery cells 1214, the powder 1500 can decompose and produce an inert gas or gases. For example, onset temperature for decomposition of the flame retardant material (the decomposition temperature) may be in the range of about 100° C. to about 150° C., and is selected such that it is below the flash point temperature of the specific electrolyte solvent in the particular batteries to be housed in the battery housing. The inert gases produced on decomposition of the powder 1500 may include, for example, nitrogen gas ($N_2$), carbon dioxide ($CO_2$), or the like. The expelled flame retardant powder and inert gas(es) may provide a fire retardant effect by displacing flammable gases such as oxygen ($O_2$) that are present around the housing 1200, or by diluting the air around the housing 1200, thus reducing or eliminating supply of oxygen and other flammable gases that may be required to sustain the fire.

Optionally, the powder 1500 may be selected so that when the powder material decomposes on heating, the decomposition reaction is endothermic. The decomposition of the powder material can thus absorb heat and reduce the temperature in the battery housing 1200 or in the surrounding air, thus providing a cooling effect. This cooling effect can further prevent or retard fire.

In some embodiments, an additive may be included in the powder 1500. For example, a stabilizer or surfactant may be included to reduce the surface energy level so that the powder 1500 does not tend to agglomerate during storage or use.

For some batteries, a suitable flame retardant powder material may be Ammonia Polyphosphate (APP) Phase I [APP: (NH4 PO3)n], CAS No. 68333-79-9. APP Phase I is available in the form of fine, free-flow white powder.

In some embodiments, melamine may be used to form a flame retardant powder.

Further possible flame retardant materials for forming the flame retardant power may include ammonium polyphosphate, triphenyl phosphate, tricresyl phosphate, bis(diphenyl) phosphate, melamine phosphate, or the like. Additional thermal active compounds that are decomposable into inert gases may also be used. Further, various combinations or mixtures of suitable materials may also be used in the flame retardant power.

The sizes of through-holes 1222 (and holes 1232) can be selected based on a number of factors or considerations. In particular, the size of through-holes 1222 may be selected in consideration of both the nature and properties of the powder 1500 and the battery cells 1214. If through-holes 1222 are too small, as compared to the particle sizes of the powder 1500, the holes may not allow effective expulsion or ejection of the powder 1500 through the through-holes 1222, or the through-holes 1222 may be easily jammed or blocked.

The sizes of the holes may also affect the pressure build-up in the powder chamber defined by the lid 1220 and powder try 1230. The expected pressure that can be reached inside the lid assembly 1240 may be a function of the characteristics of the battery cells 1214, the properties of the specific material in the powder 1500, and the sizes of through-holes 1222 and holes 1232.

The sizes of the flame retardant powder 1500 are sufficiently fine so that the powder 1500 can be expelled through the holes 1222. Further, it will be beneficial if the ejected flame retardant powder 1500 is able to be suspended in the air around the battery housing 1200 over an extended period. If the powder is too heavy and would drop downward too quickly, the retardant effect would be reduced.

The through-holes 1222 and 1232 are sized to allow ejection of the flame retardant powder 1500. For example, a through-hole opening may have a circular shape and a diameter of about 0.5 mm to about 5 mm. The through-holes may have the same shapes and sizes, or the shapes and sizes of the through-holes may vary. The sizes of the through-holes in each particularly application may be selected depending on the battery size, the size of the battery housing, the particular chemical materials and chemical reactions involved.

The through-holes 1222 may be uniformly distributed on the lid 1220, and the number of through-holes 1222 and their positions may be selected to provide optimal retardant effects, without unduly affecting the integrity and mechanical strength of the lid 1220.

During use, when a thermal runaway occurs, one or more of cells 1214 will heat up, even causing fire, and may release a gas. The heat, and optionally the released gas, can be transferred to the powder 1500 in the powder chamber through holes 1232 of the powder tray 1230.

Figure 15:
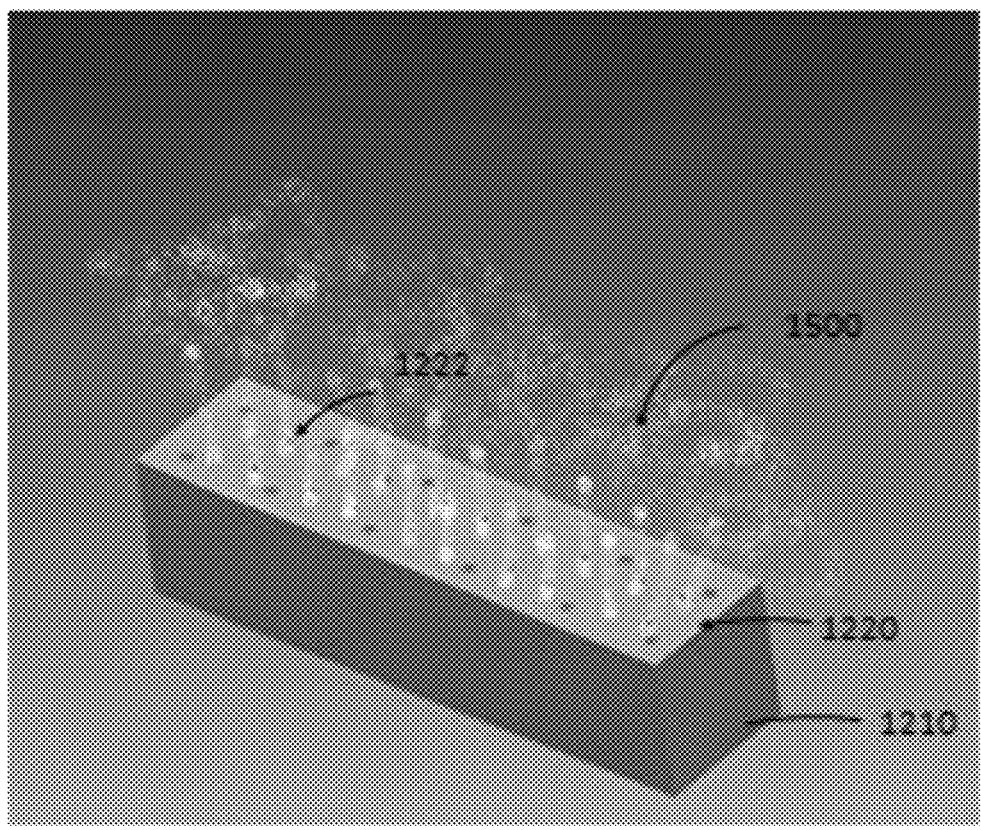
FIG. 15 is a top perspective view of the battery housing of FIG. 12 in operation.

Once the powder 1500 is heated to a threshold temperature, the powder 1500 may begin to decompose and release inert gas(es). As a result, the pressure in the powder chamber of the lid assembly 1240 can increase quickly during a thermal runaway or fire, and the pressure will eventually be high enough to expel at least some of the powder 1500 out of the lid 1220 through through-holes 1222, as illustrated in FIG. 15. Some of the inert gas(es) generated by decomposition of the powder 1500 may also exit the lid 1220 through through-holes 1222.

When the through-holes 1220 are evenly and uniformly distributed on the top of the battery housing 1200 such as depicted in the drawings and the powder 1500 is sufficiently fine, the expelled powder 1500, and any gas egressed from the through-holes 1222, can form a cloud hovering over the battery housing 1200, which may form a cloud layer or blanket enveloping or enclosing the battery housing 1200.

Some powder 1500 and inert gas(es) may enter the cavities 1212 in the body 1210 through holes 1232 as well.

The expelled powder 1500 can also decompose outside the lid 1220 if the surrounding temperature is high enough due to the thermal runaway, and such further decomposition will generate more inert gas(es) outside the housing 1200. As noted above, the inert gases produced by the decomposition reaction may include $CO_2$, $N_2$, or the like, depending on the particular powder material used.

The cloud of the powder 1500 and the inert gas(es) generated inside or outside the battery housing 1200 covering the battery housing 1200 can effectively reduce the concentration of oxygen ($O_2$) in the environmental air around the battery housing 1200, and can prevent or reduce the chances of fire during thermal runaway. If there is already fire in the battery housing 1200, the cloud of the powder and inert gas(es) can also suppress the fire, by reducing the supply of oxygen or other gases required to sustain the fire.

When the powder 1500 decomposes by an endothermic reaction, heat is absorbed from the housing 1200 and the surrounding environment, resulting in a cooling effect. This cooling effect can also help to further prevent or retard the fire. It should be noted that decomposition of the powder 1500 inside and outside the battery housing 1200 can both have a beneficial effect for fire retarding.

The holes 1232 initially provide a venting passageway from a battery chamber, i.e., cavity 1212, to the powder chamber in the lid assembly 1240. After a substantial portion of the powder 1500 is expelled, the powder chamber and the holes 1222 and 1232 can provide a venting passageway to allow any further gas generated inside a cavity 1212 to quickly escape, as discussed previously with regard to other embodiments of the disclosure. In some embodiments, the powder tray 1230 may be formed of an intumescent material as described earlier, so that the holes 1232 at a particular cavity 1212 for a particular battery cell 1214 can be blocked when the local temperature further increases.

As now can be appreciated, various modifications and variations to the embodiment illustrated in FIGS. 12-15 are possible. For example, to keep the powder 1500 intact inside the lid 1220 before it needs to be expelled, holes 1222 and 1232 may be provided as "blind holes", i.e. initially covered with a thin film (not shown) affixed along the underside side of the lid 1220 and along the top side of the powder tray 1230 respectively, at least in areas proximate the holes 1222 or 1232. The film can also prevent leakage of the powder during transportation and storage.

Optionally, the powder 1500 may be placed inside separate plastic pouches (not shown), which can be formed of a material that can quickly disintegrate or melt away when heated during a thermal runaway.

As illustrated in FIGS. 13 and 14, the cavities 1212 in the battery housing 1200 are isolated individual cavities. However, in different embodiments, it is not necessary to provide an individual compartment for each battery cell. For example, if the housing material is not intumescent, a single compartment may be provided to house multiple battery cells, and the space between the battery cells may be packed with a suitable flame retardant material. The flame retardant material can also serve as packing material. As can be appreciated, regardless of whether there are multiple or a single cell compartment in the body 1210, the underside of the lid assembly 1240 may include a retaining structure, such as lips 1234, for confining the battery cells and limiting their movement.

As noted, the body 1210 may also be packed with a flame retardant material, which may be the same or different from the powder material in the lid assembly 1240. In one embodiment, the gaps between the batteries 1214 and the cavity walls in cavities 1212 may be filled and packed with flame retardant powder. When cavities 1212 in the body 1210 are also filled or packed with a flame retardant powder, such as flame retardant powder 1500, additional vent holes (not shown in FIGS. 12-15, but see FIG. 16) may be provided on the sides of the body 1210.

Figure 16:
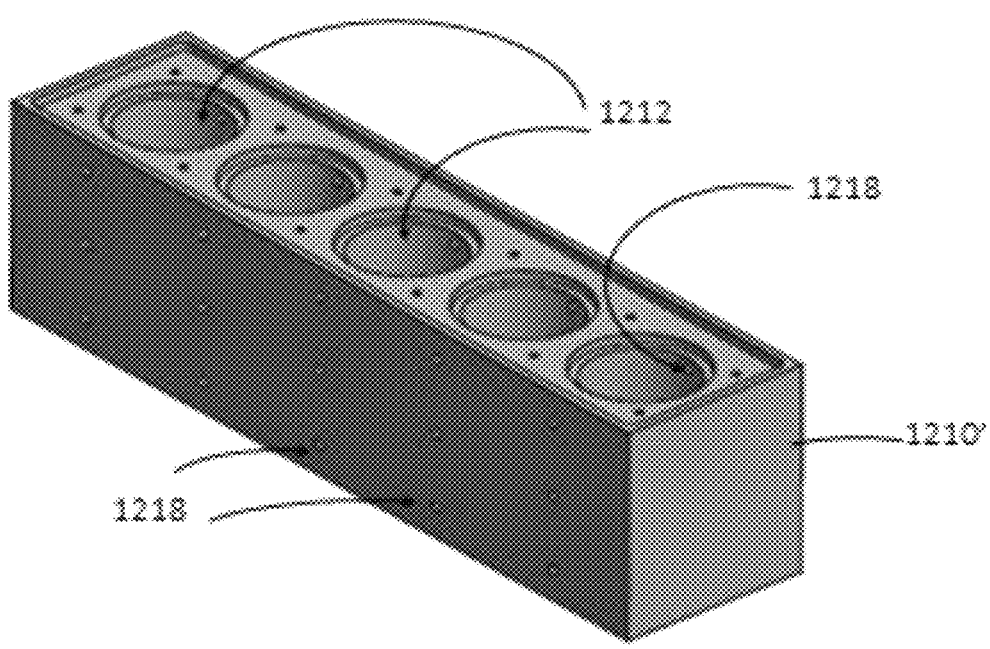
FIG. 16 is a top perspective view of a battery housing body with side vent holes.

FIG. 16 illustrates a housing body 1210' with side vent holes 1218, which may be used to replace body 1210. The body 1210' is similar to body 1210 except the additional provision of the side vent holes 1218, which are through-holes providing pathways from the cell cavities 1212 to the outside environment to allow any powder packed, or a gas generated, inside a cell cavity 1212 to be vented or expelled to the outside. The vent holes 1218 may be provided as blind holes covered by a film (not shown) that can be readily removed during a fire or thermal runaway. The additional holes on the sides of the battery housing can provide better dispersion of the flame retardant powder into the surroundings around the battery housing, and may provide better coverage and insulation on all sides of the battery housing.

As can be appreciated, there are many existing battery housings or battery boxes in use. Such battery housings or boxes may be retrofit with specifically designed and constructed lid assemblies that are similar to the lid assembly 1240 or its variants as described herein.

While not depicted in the figures, lid 1220 or lid assembly 1240 may include clips (not shown) for mating with the body 1210 of the housing 1200, similar to the clips 212 or 312 in the battery housings 200 and 300. In such cases, the fasteners 1224 may be omitted.

In an embodiment of the disclosure, a battery housing may include a first housing portion and a second housing portion mateable with the first housing portion. The first and second housing portions, when mated, provide a battery chamber dimensioned to hold at least one battery, a powder chamber for storing a powder, and a venting passageway from the battery chamber to the powder chamber. The powder chamber has openings for expelling stored powder out of the battery housing in the event of thermal runaway of a battery housed in the battery chamber. At least a portion of at least one of the first and second housing portions may include an intumescent flame retardant material with an expansion ratio sufficient to drive gas from the battery chamber through the venting passageway and to seal the battery chamber, when the flame retardant material intumesces in the event of thermal runaway of the battery. The second housing portion may include a lid and the powder chamber, such as in the form of the lid assembly of 1240. The powder may include any of the flame retardant powder materials discussed above. The flame retardant powder material, when heated, may decomposes by an endothermic reaction to release an inert gas. The openings may be evenly or uniformly distributed on the top of the battery housing, so that the expelled powder may be distributed around the battery housing through the openings to form a suspended cloud enveloping or enclosing the battery housing.

Another embodiment of the disclosure relates to a lid for covering a battery housing. The lid includes a chamber storing a powder. The chamber has openings for expelling at least a portion of the stored powder out of the lid and the battery housing in the event of thermal runaway of a battery housed in the battery housing. The powder comprises a flame retardant material that, when heated, decomposes by an endothermic reaction to release an inert gas. The lid may include the lid assembly of 1240.

Optionally, any of the battery housings and casings disclosed herein may be lined with ceramic or other fire-resistant fabrics (e.g., Kaowool™, basalt, Nextel™, and Nomex™), to improve flame penetration and thermal insulation performance.

In the foregoing, the term "battery" refers to any type of primary or secondary cell or battery.

The above described embodiments are intended to be illustrative only and in no way limiting. The described embodiments are susceptible to many modifications of form, arrangement of parts, details and order of operation, as will be appreciated by one of skill in the art. The invention is intended to encompass all such modification within its scope, as defined by the claims.

What is claimed is:

1. A battery housing comprising:
a first housing portion;
a second housing portion mateable with said first housing portion;
said first housing portion and said second housing portion, when mated, providing:
a battery chamber dimensioned to hold at least one battery; and
a venting passageway from said battery chamber;
at least a wall in a portion of at least one of said first housing portion and said second housing portion comprising an intumescent flame retardant material with an expansion ratio sufficient to drive gas from said battery chamber through said venting passageway and to seal said battery chamber, when said material intumesces in the event of thermal runaway of the at least one battery housed in said battery chamber,
a first metal plug embedded in said first housing portion so as to extend from said battery chamber to an exterior of said housing and a second metal plug embedded in said second housing portion so as to extend from said battery chamber to an exterior of said housing, said first metal plug and said second metal plug for providing an electrical connection to the at least one battery housed in said battery chamber,
at least one of said first housing portion or said second housing portion further providing a powder chamber for storing a powder, said powder chamber having a plurality of openings for expelling stored powder out of said battery housing in the event of thermal runaway.

2. The battery housing of claim 1, wherein said expansion ratio of said intumescent flame retardant material is at least 1.2.

3. A battery housing comprising:
a first housing portion;
a second housing portion mateable with said first housing portion;
said first housing portion and said second housing portion, when mated, providing:
a battery chamber dimensioned to hold at least one battery; and
a venting passageway from said battery chamber;
at least a wall in a portion of at least one of said first housing portion and said second housing portion comprising an intumescent flame retardant material with an expansion ratio sufficient to drive gas from said battery chamber through said venting passageway and to seal said battery chamber, when said material intumesces in the event of thermal runaway of the at least one battery housed in said battery chamber,
at least one of said first housing portion or said second housing portion further providing a powder chamber for storing a powder, said powder chamber having a plurality of openings for expelling stored powder out of said battery housing in the event of thermal runaway,
wherein said venting passageway is blocked by a blockage that fails when exposed to pressure created in said battery chamber by said thermal runaway, and
wherein said blockage is formed from an identical material to that of a material forming one of said first housing portion and said second housing portion.

4. The battery housing of claim 3, wherein said blockage has a thickness such that said blockage is broken by said pressure.

5. The battery housing of claim 1, further comprising a lip projecting from at least one of a top surface or a bottom surface of said battery housing, arranged so as to extend substantially about a perimeter of said one of said top surface or said bottom surface, to provide a space above or below said battery housing when stacked.

6. The battery housing of claim 5, wherein said lip has an interruption providing a gap that allows gas to travel out of said space during said thermal runaway.

7. The battery housing of claim 1, wherein said intumescent flame retardant material comprises a polymer and a blowing agent, said polymer comprising one of a thermoplastic or a thermosetting plastic.

8. The battery housing of claim 7, wherein said blowing agent comprises expandable graphite.

9. The battery housing of claim 7, wherein said blowing agent comprises an alkali metal hydrated silicate.

10. The battery housing of claim 7, wherein said blowing agent is between 1% and 70% by weight of said intumescent flame retardant material.

11. The battery housing of claim 1, wherein said intumescent flame retardant material further comprises a fire retardant, said fire retardant being between 5% and 55% by weight of said intumescent flame retardant material.

12. The battery housing of claim 3, wherein the second housing portion comprises a lid and said powder chamber.

13. The battery housing of claim 3, wherein said powder chamber is filled with said powder, said powder comprising a flame retardant material that, when heated, decomposes by an endothermic reaction to release an inert gas.

14. A battery housing comprising:
a first housing portion; and
a second housing portion mateable with said first housing portion;
said first housing portion and said second housing portion, when mated, providing:
a battery chamber dimensioned to hold at least one battery; and
a venting passageway from said battery chamber;
at least a wall in a portion of at least one of said first housing portion and said second housing portion comprising an intumescent flame retardant material with an expansion ratio sufficient to drive gas from said battery chamber through said venting passageway and to seal said battery chamber, when said intumescent flame retardant material intumesces in the event of thermal runaway of the at least one battery housed in said battery chamber; and
at least one of said first housing portion or said second housing portion further providing a powder chamber for storing a powder, said powder chamber having a plurality of openings for expelling stored powder out of said battery housing in the event of thermal runaway.

15. The battery housing of claim 14, wherein said first housing portion comprises a lid and said powder chamber, said lid comprising through-holes for expelling at least a portion of the stored powder out of the powder chamber through the through-holes.

16. The battery housing of claim 14, wherein said powder chamber is filled with said powder, said powder comprising a flame retardant material that, when heated, decomposes by an endothermic reaction to release an inert gas.

17. The battery housing of claim 16, wherein the flame retardant material of said powder comprises Phase I ammonia polyphosphate.

18. The battery housing of claim 16, wherein the flame retardant material of said powder decomposes at a temperature below about 150° C.

19. The battery housing of claim 14, wherein said powder chamber is separated from said battery chamber.

20. The battery housing of claim 14, wherein said at least one battery is held in said battery chamber, and a gap between said at least one battery and said battery chamber is filled with said powder.

21. The battery housing of claim 20, wherein said battery chamber having a plurality of venting holes for expelling said powder out of the battery housing in the event of thermal runaway.

22. The battery housing of claim 14, wherein said openings of said powder chamber have a diameter of about 0.5 mm to about 5 mm.

23. The battery housing of claim 15, wherein said venting passageway extends from said battery chamber to said powder chamber.

24. The battery housing of claim 14, wherein said openings of said powder chamber are blind holes.

25. The battery housing of claim 14, wherein said powder chamber is filled and packed with said powder.

* * * * *